(12) United States Patent
Oishi et al.

(10) Patent No.: US 7,892,121 B2
(45) Date of Patent: Feb. 22, 2011

(54) STRADDLE-TYPE VEHICLE

(75) Inventors: Akifumi Oishi, Shizuoka (JP); Yousuke Ishida, Shizuoka (JP); Takuji Murayama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 594 days.

(21) Appl. No.: 11/557,008

(22) Filed: Nov. 6, 2006

(65) Prior Publication Data

US 2007/0105670 A1    May 10, 2007

(30) Foreign Application Priority Data

Nov. 7, 2005    (JP) ............................. 2005-322860

(51) Int. Cl.
*F16H 55/56*    (2006.01)
*F16H 59/00*    (2006.01)

(52) U.S. Cl. ............................. 474/17; 474/8; 474/11; 474/12; 474/13; 474/14; 474/15; 474/16; 474/43; 474/46

(58) Field of Classification Search ............... 474/17; 192/105 CD, 105 CP, 30 V; *F16H 9/18*
See application file for complete search history.

(56) References Cited

U.S. PATENT DOCUMENTS

| | | | | |
|---|---|---|---|---|
| 4,051,739 A | * | 10/1977 | Takagi et al. | 474/14 |
| 5,439,419 A | * | 8/1995 | Yamada et al. | 474/18 |
| 5,924,944 A | * | 7/1999 | Hashimoto | 474/18 |
| 6,682,450 B2 | * | 1/2004 | Mukai et al. | 474/15 |

FOREIGN PATENT DOCUMENTS

| | | | | |
|---|---|---|---|---|
| JP | | 04254035 A | * | 9/1992 |
| WO | | 2004/044457 | | 5/2004 |
| WO | | WO-2004044457 | * | 5/2004 |

* cited by examiner

*Primary Examiner*—Robert A Siconolfi
*Assistant Examiner*—San Aung
(74) *Attorney, Agent, or Firm*—Keating & Bennett, LLP

(57) ABSTRACT

In a motorcycle having a V-belt type continuously variable transmission, a resin washer made of a nylon resin is interposed between a boss fixed to a moving sheave half of a secondary sheave and a spring bearing member. The boss contacts the spring bearing member through the resin washer, whereby the moving sheave half is restricted to a Top position, in which a spacing between it and a stationary sheave half becomes maximum. In this manner, the maximum speed is not changed by exchange of the V-belt, the V-belt does not slip or become considerably abraded or deteriorated, and noise generation is suppressed.

12 Claims, 17 Drawing Sheets

STRADDLE-TYPE VEHICLE

RELATED APPLICATIONS

This application claims the benefit of priority under 35 USC 119 of Japanese patent application no. 2005-322860, filed on Nov. 7, 2005, which application is hereby incorporated by reference in its entirety.

BACKGROUND OF THE INVENTION

1. Field of the Invention

The present invention relates to a V-belt type continuously variable transmission for a straddle-type vehicle.

2. Description of Related Art

In a conventional motorcycle provided with a V-belt type continuously variable transmission, as travel distance is increased, a speed reduction ratio at the time of Top, when a wound diameter of a secondary sheave on a driven side is minimum, is gradually increased due to abrasion of the V-belt, and a maximum speed is consequently lowered. Accordingly, the V-belt needs to be exchanged when it has worn to some extent.

Related art such as WO 2004/044457, for example, discloses a V-belt type continuously variable transmission, in which the exchange time of a V-belt is extended. A V-belt type continuously variable transmission according to related art such as WO 2004/044457 is now explained with reference to FIG. 17.

As shown in FIG. 17, the V-belt type continuously variable transmission (referred below to as CVT) 530 according to the related art comprises a primary sheave 571, a secondary sheave 572, and a V-belt 573 wound around the primary sheave 571 and the secondary sheave 572.

The primary sheave 571 comprises a stationary sheave half 571a, positioned on the right in FIG. 17, and a moving sheave half 571b, positioned on the left in FIG. 17 and opposed to the stationary sheave half 571a. The stationary sheave half 571a is clamped and fixed to a right end of a primary sheave shaft 546c by a lock nut 615 to rotate together with the primary sheave shaft 546c. The moving sheave half 571b rotates together with the primary sheave shaft 546c and is slidable in an axial direction of the primary sheave shaft 546c. A cam surface 611 is formed on the left side of the moving sheave half 571b and a cam plate 612 is arranged on the left of the cam surface 611. A roller weight 613 is arranged between the cam surface 611 and the cam plate 612.

The secondary sheave 572 comprises a stationary sheave half 572a, positioned on the left in FIG. 17, and a moving sheave half 572b, positioned on the right in FIG. 17 and opposed to the stationary sheave half 572a. The moving sheave half 572b is mounted to a right end of a secondary sheave shaft 562. The moving sheave half 572b rotates together with the secondary sheave shaft 562 and is slidable in an axial direction of the secondary sheave shaft 562. The stationary sheave half 572a comprises a substantially doughnut-plate shaped sheave body portion 572c, around which the V-belt 573 is wound, and a substantially cylindrical-shaped boss portion 572d extended toward the right from a right side surface of the sheave body portion 572c. The sheave body portion 572c and the boss portion 572d are fixed together. Also, the boss portion 572d is spline-fitted onto the secondary sheave shaft 562.

A cylindrical-shaped boss 617 fixed to an axial core portion of the moving sheave half 572b is provided on the sheave body portion 572c to be slidable axially of the boss portion 572d. A slide groove 617a is formed on the boss 617 in a slit manner and engaged by a guide pin 618, which is implanted on the boss portion 572d, in a manner to make the same slidable and permit rotation of the boss portion 572d with the boss 617.

A spring bearing member 619 formed from an annular plate is mounted to a tip end of the boss portion 572d of the stationary sheave half 572a by a circlip 619a and a coil spring 620 is interposed between the spring bearing member 619 and the moving sheave half 572b. The secondary sheave shaft 562 and the boss portion 572d of the stationary sheave half 572a are clamped and fixed together by a lock nut 616 provided on the secondary sheave shaft 562.

When an engine (not shown) rotates and the primary sheave shaft 546c is increased in rotation speed, the moving sheave half 571b of the primary sheave 571 is moved toward the stationary sheave half 571a by a centrifugal force of the roller weight 613. Thereby, the primary sheave 571 is gradually increased in wound diameter and the secondary sheave 572 is gradually decreased in wound diameter, with the result that a speed reduction ratio is gradually decreased.

When the primary sheave shaft 546c is further increased in rotation speed, the primary sheave 571 is further increased in wound diameter by a centrifugal force of the roller weight 613 and the moving sheave half 571b of the primary sheave 571 comes to a Top position, in which a spacing between it and the stationary sheave half 571a is minimum. In the Top position, a spacing between the stationary sheave half 572a and the moving sheave half 572b of the secondary sheave 572 is maximum.

FIG. 17 shows a point of time when the moving sheave half 571b of the primary sheave 571 comes to the Top position. As shown in FIG. 17, a right tip end 617b of the boss 617 contacts the spring bearing member 619 in the Top position. Thereby, the moving sheave half 572b on the secondary sheave 572 is restricted to the Top position. In this state, a clearance b is formed between the roller weight 613 and the moving sheave half 571b of the primary sheave 571. At this time, R1 indicates a wound diameter of the primary sheave 571 and R2 indicates a wound diameter of the secondary sheave 572.

While FIG. 17 shows the case where the V-belt 573 is little used, the V-belt 573 wears gradually and a belt width (L) decreases as a travel distance is increased. Then, since the clearance b is formed, the moving sheave half 571b of the primary sheave 571 moves toward the stationary sheave half 571a corresponding to an amount of wear, so that a wound diameter of the primary sheave 571 becomes larger than R1. When the roller weight 613 contacts the moving sheave half 571b and the clearance b disappears, the moving sheave half 571b is restricted to a corrected Top position, in which a spacing between it and the stationary sheave half 571a is smaller than that in the Top position.

On the other hand, since the moving sheave half 572b on the secondary sheave 572 is restricted to the Top position, the V-belt 573 is moved toward an axis and a wound diameter becomes smaller than R2. In this manner, a speed reduction ratio at the time of Top becomes small as compared with that when the V-belt 573 is not used.

When a travel distance is further increased and the V-belt 573 is further decreased in belt width, the V-belt 573 is moved toward an axis and a wound diameter is returned to a magnitude, which is substantially equal to an initial wound diameter R1 since the moving sheave half 571b of the primary sheave 571 is restricted in position. On the other hand, the moving sheave half 572b on the secondary sheave 572 is moved toward the stationary sheave half 572a by the bias of the coil spring 620 corresponding to an amount, by which the V-belt 573 is worn. Thereby, a wound diameter of the secondary sheave 572 returns to a magnitude, which is substantially equal to an initial wound diameter R2. In this manner, a speed reduction ratio at the time of Top becomes substantially equal to that when the V-belt 573 is not used. Thereafter, as a travel distance is increased, a speed reduction ratio at the time of Top is increased.

In this manner, in the V-belt type continuously variable transmission 530 according to the related art, it is possible to extend the travel distance until a speed reduction ratio, at which exchange of the V-belt 573 is needed, is reached, with the result that time for exchange of the V-belt 573 is extended.

However, the related art has a problem in that the maximum speed after the V-belt is exchanged is different from the maximum speed before the V-belt was exchanged. After having earnestly studied the cause for this change in maximum speed, the inventors of the present application have found that the cause resides in collision between the boss 617 and the spring bearing member 619.

That is, since both the boss 617 fixed to the moving sheave half 572b of the secondary sheave 572, and the spring bearing member 619 that supports the coil spring 620, are made of metallic members, they collide many times during running and are consequently shaven and worn. Therefore, the Top position of the moving sheave half 572b varies and is responsible for a change in maximum speed in running after exchange of a V-belt.

SUMMARY OF THE INVENTION

The invention has been thought of in view of this point and has its object to prevent a change in maximum speed due to the exchange of a V-belt.

The invention provides a V-belt type continuously variable transmission comprising first and second sheave shafts and first and second sheaves that rotate together with the first and second sheave shafts. Each of the first and second sheaves comprises a stationary sheave half that is axially immovable, and a moving sheave half that rotates together with the first and second sheave shafts and is axially movable. A V-belt is wound around the first and second sheaves. A stopper comprises a stationary contact member fixed to be axially immovable, a moving contact member formed integral with, or fixed separately from the moving sheave half, and an abrasion preventive layer made of an abrasion-resistant material and interposed between the stationary contact member and the moving contact member. The moving contact member contacts the stationary contact member through the abrasion preventive layer to thereby restrict a spacing between the moving sheave half and the stationary sheave half.

The V-belt type continuously variable transmission comprises a stopper that restricts a spacing between the moving sheave half and the stationary sheave half, and an abrasion preventive layer made of an abrasion-resistant material is interposed between the stationary contact member and the moving contact member on the stopper. Therefore, it is possible to prevent contact portions from being scraped by repeated collisions of the moving sheave half and the stationary sheave half to lead to a change in maximum or minimum value of a spacing between the moving sheave half and the stationary sheave half. Consequently, it is possible to prevent a maximum running speed from being changed after exchange of the V-belt.

Thus, according to the invention, it is possible in a V-belt type continuously variable transmission comprising a stopper, which restricts a spacing between a moving sheave half and a stationary sheave half, to prevent a maximum speed from being changed in running after exchange of the V-belt. It is also possible to prevent the V-belt from slipping off a sheave or being considerably abraded or deteriorated.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An embodiment of the invention is described below in detail with reference to the drawings.

First Embodiment

Figure 1:
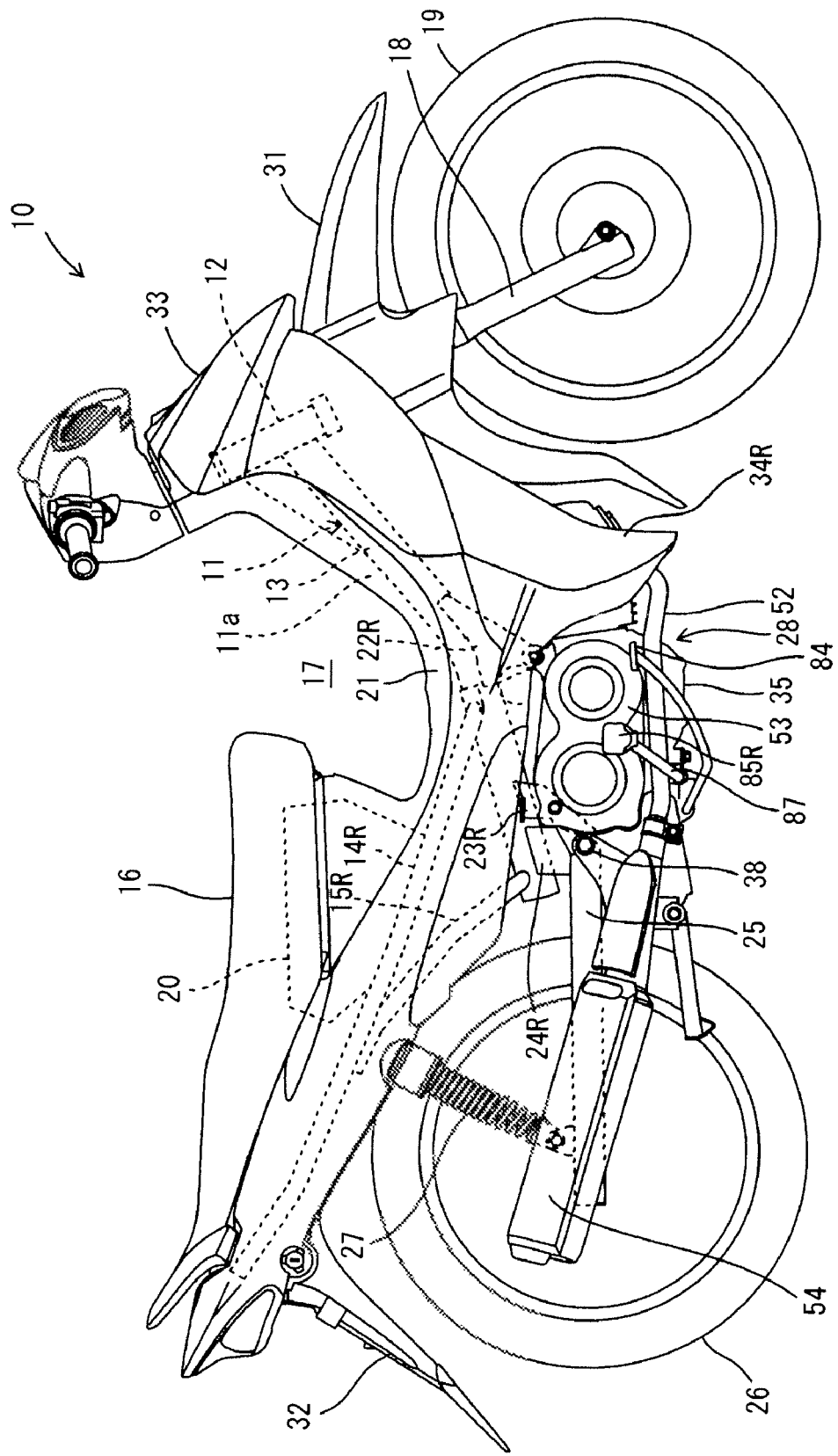
FIG. 1 is a side view of a motorcycle according to a first embodiment of the invention.

As shown in FIG. 1, a straddle-type vehicle according to the first embodiment is a motorcycle 10. The motorcycle 10 comprises a vehicle body frame 11, which forms a skeleton, and a seat 16, on which a crew is seated. The motorcycle 10 is a so-called moped type motorcycle. That is, a concave space 17 recessed downward as viewed in side view is formed forwardly of the seat 16 and a crew seated on the seat 16 straddles the vehicle body frame 11 to ride. The term "moped type" as used herein refers only to a particular shape of a vehicle and does not limit maximum speed, displacement, magnitude, etc. of the vehicle.

Moreover, the invention is not limited to a moped type motorcycle but also applies to other motorcycles, such as so-called motorcycle types in which a fuel tank is arranged forwardly of a seat. Also, the invention is not limited to a motorcycle but also applies to other straddle-type vehicles such as four-wheeled buggies, etc.

In the following description, longitudinal and left and right directions mean directions as viewed from the perspective of a crew seated on the seat 16. The vehicle body frame 11 comprises a steering head pipe 12, a single main frame 13 extending rearward and obliquely downward from the steering head pipe 12, left and right seat rails 14L, 14R extending rearward and obliquely upward from an intermediate portion of the main frame 13, and left and right seat pillar tubes 15L, 15R connected to a rear end of the main frame 13 and intermediate portions of the seat rails 14L, 14R.

Upper and left and right sides of the vehicle body frame 11 are covered by a vehicle body cover 21. Compartmented below the vehicle body cover 21 is a center tunnel 11a, which makes a passage of the main frame 13.

A front wheel 19 is supported through a front fork 18 on the steering head pipe 12. A fuel tank 20 and the seat 16 are supported above the seat rails 14L, 14R. The seat 16 extends from above the fuel tank 20 toward rear ends of the seat rails 14L, 14R. The fuel tank 20 is arranged above front halves of the seat rails 14L, 14R and covered by the vehicle body cover 21 and the seat 16.

A pair of first left and right engine brackets 22L, 22R extend downward from an intermediate portion of the main frame 13. A pair of second left and right engine brackets 23L, 23R and a pair of left and right rear arm brackets 24L, 24R are provided at the rear end of the main frame 13. The first engine brackets 22L, 22R, the second engine brackets 23L, 23R, and the rear arm brackets 24L, 24R constitute a part of the vehicle body frame 11.

The rear arm brackets 24L, 24R project downward from the rear end of the main frame 13. The rear arm brackets 24L, 24R are provided with a pivot shaft 38, and a front end of a rear arm 25 is supported on the pivot shaft 38 to be able to swing. A rear wheel 26 is supported on a rear end of the rear arm 25. A rear half of the rear arm 25 is suspended through a cushion unit 27 from the vehicle body frame 11.

Figure 5:
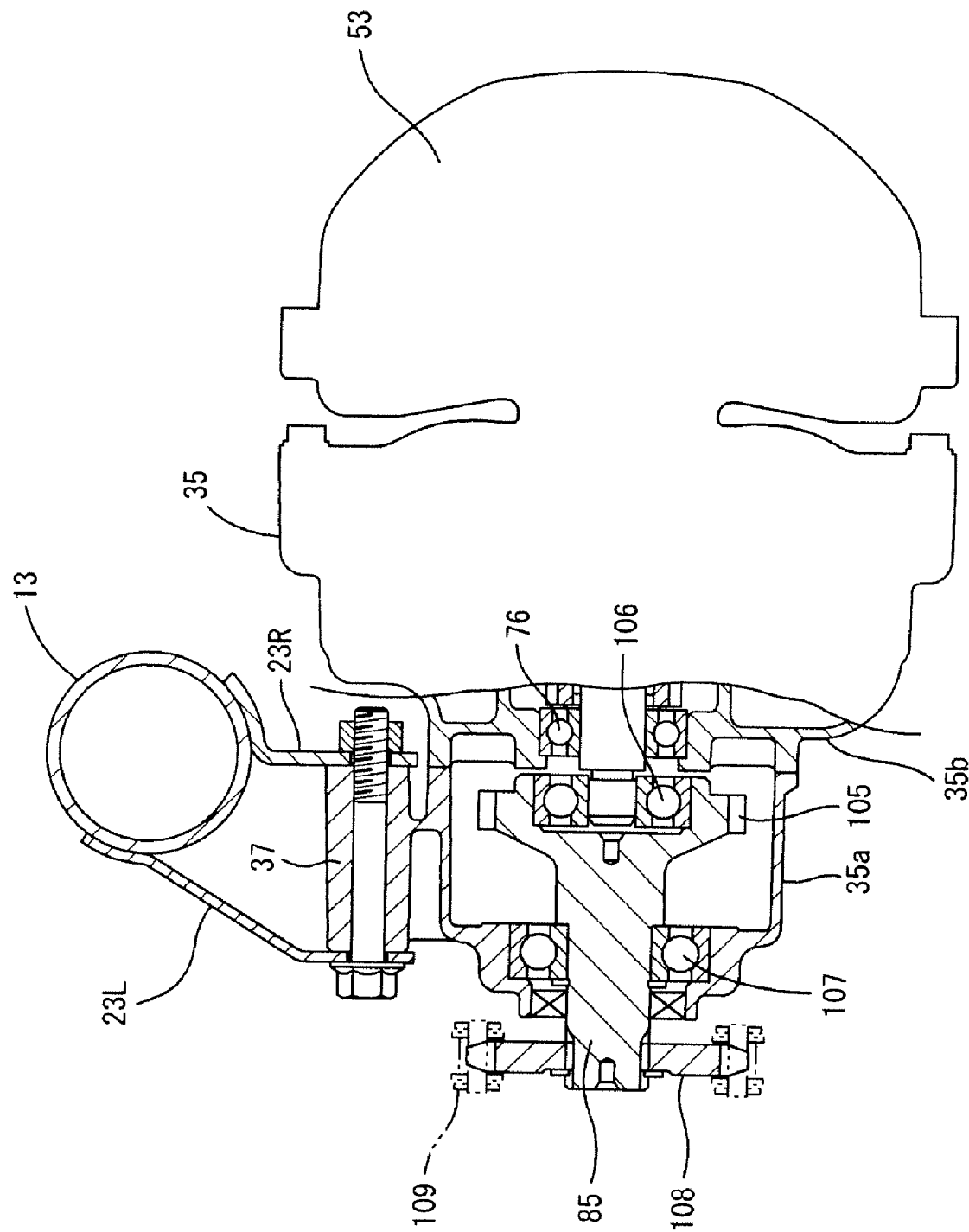
FIG. 5 is a cross sectional view showing a state, in which the engine unit is mounted.

As shown in FIG. 5, the second engine brackets 23L, 23R project downward from the rear end of the main frame 13. The brackets 23L, 23R face each other with a spacing in a vehicle width direction.

Figure 4:
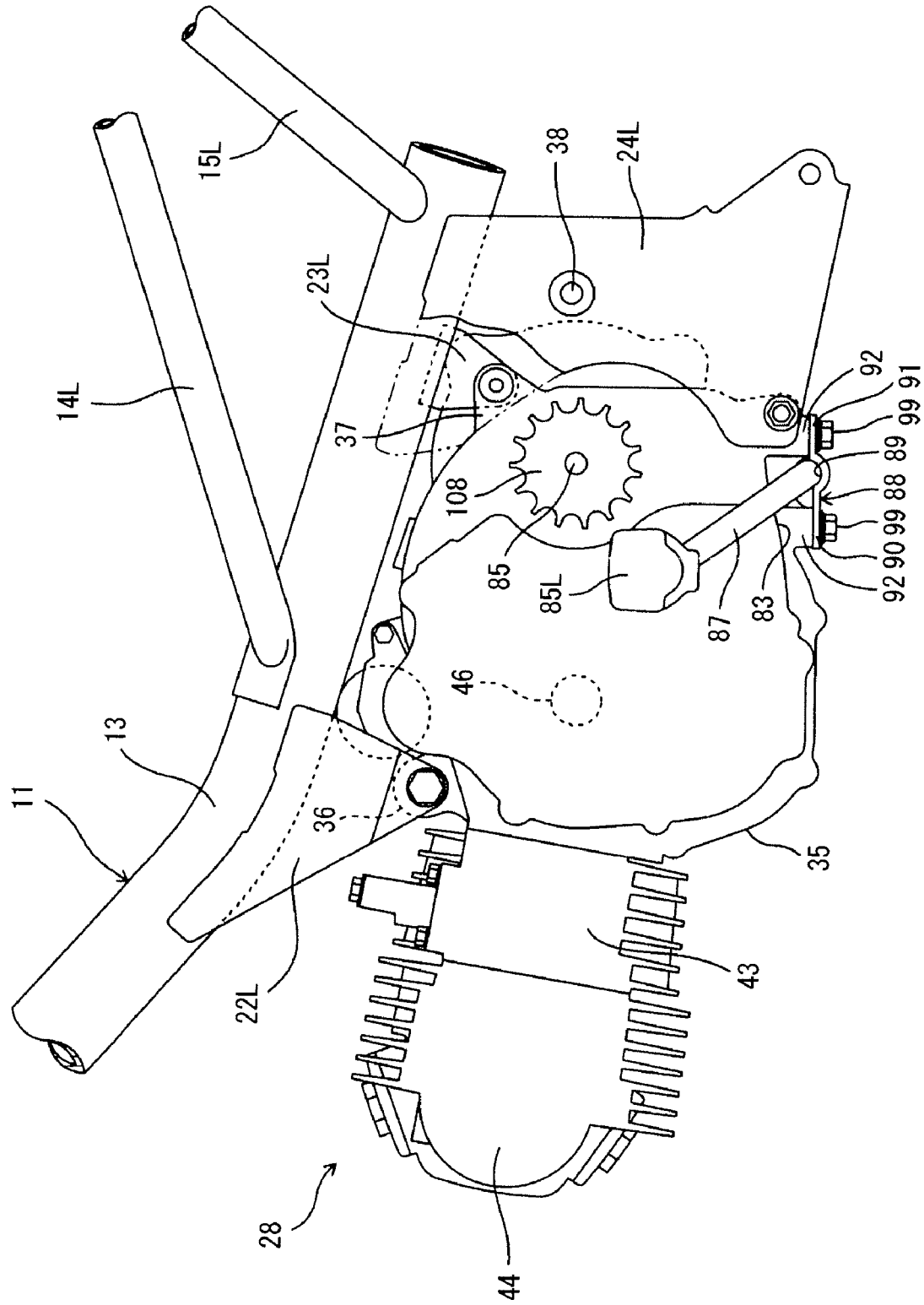
FIG. 4 is a left side view of the engine unit.

As shown in FIG. 1, an engine unit 28, which drives the rear wheel 26, is supported on the vehicle body frame 11. Specifically, as shown in FIG. 4, the engine unit 28 comprises a crank case 35, a cylinder 43, and a cylinder head 44. The crank case 35 comprises first and second engine mounts 36, 37. The first engine mount 36 projects upward from above a front end of the crank case 35 and is supported on the first engine brackets 22L, 22R. The second engine mount 37 projects rearward and obliquely upward from above a rear end of the crank case 35 and is supported on the second engine brackets 23L, 23R (also, see FIG. 5). Therefore, the crank case 35 is supported in a state of being suspended from the main frame 13.

As described later in detail, the engine unit 28 comprises an engine 29 and a V-belt type continuously variable transmission (CVT) 30 (see FIG. 6). The engine 29 is in no way limited in type but in one embodiment comprises a four-stroke single cylinder engine.

As shown in FIG. 1, the motorcycle 10 comprises a front fender 31, which covers upper and rear portions of the front wheel 19, and a rear fender 32, which covers a rear and obliquely upper portion of the rear wheel 26.

The motorcycle 10 comprises, in addition to the vehicle body cover 21 described above, a front cowl 33 and left and right leg shields 34L, 34R. The leg shields 34L, 34R comprise cover members, which cover fronts of driver's legs, and extend obliquely vertically as viewed from laterally. In addition, the leg shields 34L, 34R may be made integral with or separate from the front cowl 33.

Figure 2:
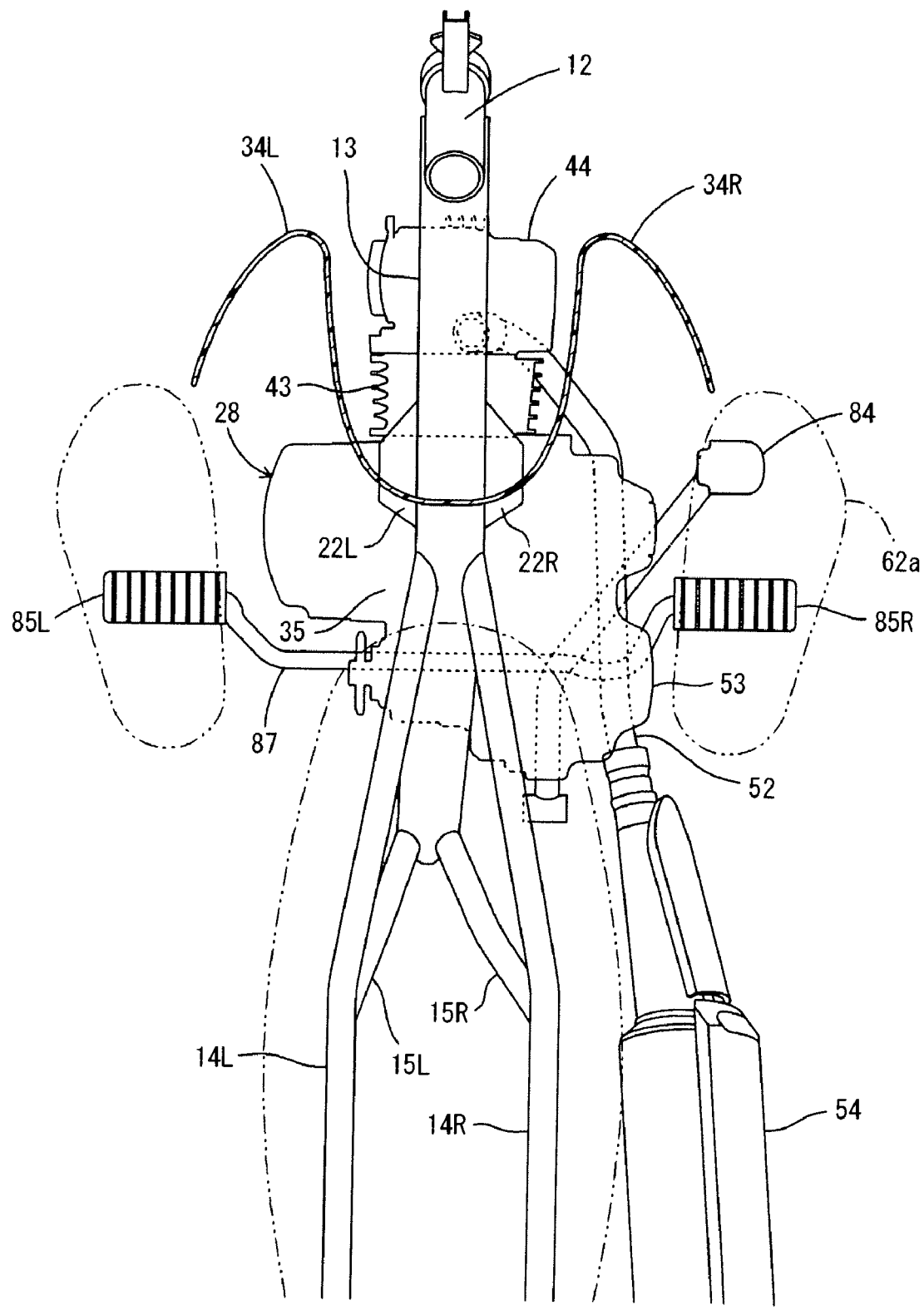
FIG. 2 is a plan view of the motorcycle of FIG. 1 showing the positional relationship among a vehicle body frame, leg shields, an engine unit, etc.

As shown in FIG. 2, the leg shields 34L, 34R have a horizontal cross section that is concave and opened rearward. In other words, the leg shields 34L, 34R have a transverse cross section curved to be substantially C-shaped and tapered forward. Consequently, spaces, of which fronts and sides are covered by the leg shields 34L, 34R, are provided on back sides (inside the concave shape) of the leg shields 34L, 34R.

According to the embodiment, the leg shields 34L, 34R are made of a resin material. However, the leg shields 34L, 34R are not limited in material.

As shown in FIG. 2, foot rests 85L, 85R made of rubber or the like are arranged on the left and the right of the engine unit 28. The foot rests 85L, 85R serve as foot put members to support a driver's feet. The left and right foot rests 85L, 85R are supported on the crank case 35 of the engine unit 28 through a metallic connecting rod 87 and a mount plate 88 (see FIGS. 3 and 4) fixed to the connecting rod 87.

Figure 3:
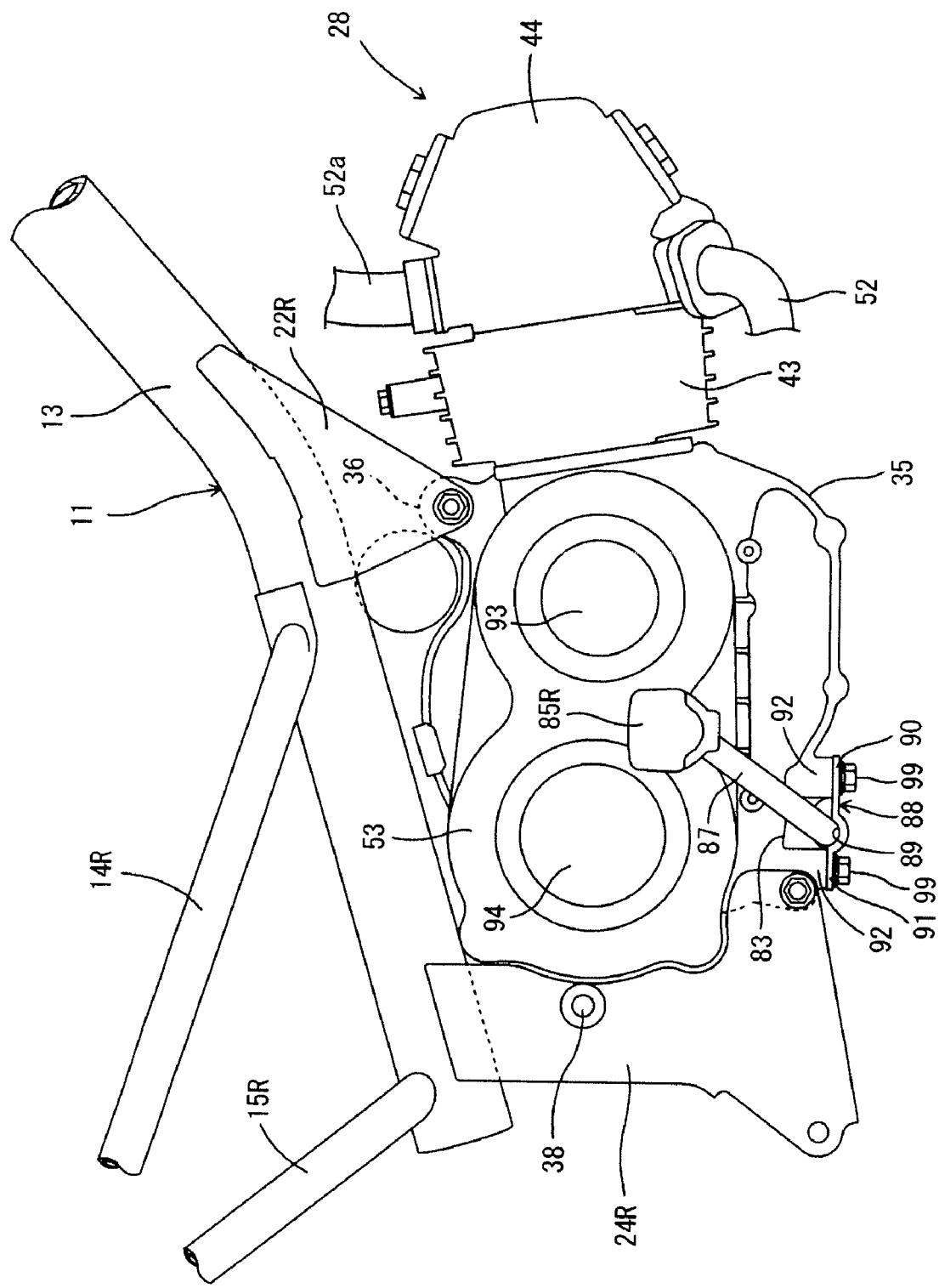
FIG. 3 is a right side view of the engine unit.

The connecting rod 87 passes below a rear half of the crank case 35 to extend in the vehicle width direction. A left end of the connecting rod 87 projects on the left of the crank case 35 to support the left foot rest 85L. A right end of the connecting rod 87 projects on the right of a transmission case 53 to support the right foot rest 85R. As shown in FIG. 3, the mount plate 88 is formed by press working of a metallic sheet and a recess 89, into which the connecting rod 87 is fitted, is formed intermediately of the mount plate 88 in the longitudinal direction. The recess 89 abuts the connecting rod 87 from under and is welded to an outer peripheral surface of the connecting rod 87.

The mount plate 88 comprises a first mount 90 in the form of a flange projecting forwardly of the connecting rod 87 and a second mount 91 in the form of a flange projecting rearwardly of the connecting rod 87. The first mount 90 and the second mount 91 extend axially (left and right) of the connecting rod 87 and face a lower surface 83 of the rear half of the crank case 35.

The lower surface 83 of the rear half of the crank case 35 comprises four (only two are shown in FIG. 3) bosses 92. The bosses 92 project downward from the lower surface 83 of the crank case 35 and are formed integral with the crank case 35. The bosses 92 are formed with bolt holes (not shown). The mount plate 88 for the foot rests 85L, 85R is also formed with bolt holes (not shown), which are positioned in correspondence to the bosses 92. The mount plate 88 and the bosses 92 are clamped together by bolts 99. In this manner, the foot rests 85L, 85R are fixed to the crank case 35 through the connecting rod 87 and to the mount plate 88 by the bolts 99.

As shown in FIGS. 1 and 2, a brake pedal 84 is provided forwardly of the right foot rest 85R. The brake pedal 84 passes below the transmission case 53 to project rightwardly obliquely and forward and to extend forward and obliquely upward on the right side of the transmission case 53. As shown in FIG. 2, when the motorcycle 10 runs, a driver's right foot 62a is adjacent to the transmission case 53 in the vehicle width direction.

An explanation is now given to an internal construction of the engine unit 28. As shown in FIG. 6, the engine unit 28 comprises the engine 29, the CVT 30, a centrifugal clutch 41, and a reduction mechanism 42.

The engine 29 comprises the crank case 35, the cylinder 43 connected to the crank case 35, and the cylinder head 44 connected to the cylinder 43. The crank case 35 comprises two split case blocks, that is, a first case block 35a positioned on the left, and a second case block 35b positioned on the right. The first case block 35a and the second case block 35b abut against each other in the vehicle width direction.

A crank shaft 46 is accommodated in the crank case 35. The crank shaft 46 extends in the vehicle width direction and is arranged to be horizontal. The crank shaft 46 is supported on the first case block 35a with a bearing 47 therebetween and supported on the second case block 35b with a bearing 48 therebetween.

A piston 50 is inserted slidably into the cylinder 43. An end of a connecting rod 51 is connected to the piston 50. A crank pin 59 is provided between a left crank arm 46a and a right crank arm 46b of the crank shaft 46. The other end of the connecting rod 51 is connected to the crank pin 59.

The cylinder head 44 is formed with a recess 44a, and intake and exhaust ports (not shown), which communicate with the recess 44a. An ignition plug 55 is inserted into the recess 44a of the cylinder head 44. As shown in FIG. 3, an intake pipe 52a is connected to the intake port and an exhaust pipe 52 is connected to the exhaust port. As shown in FIGS. 1 and 2, the exhaust pipe 52 extends rearward and rightwardly obliquely downward from the cylinder head 44, passes below the transmission case 53 of the engine unit 28 to extend further rearward, and is connected to a muffler 54 arranged on the right of the rear wheel 26.

Figure 6:
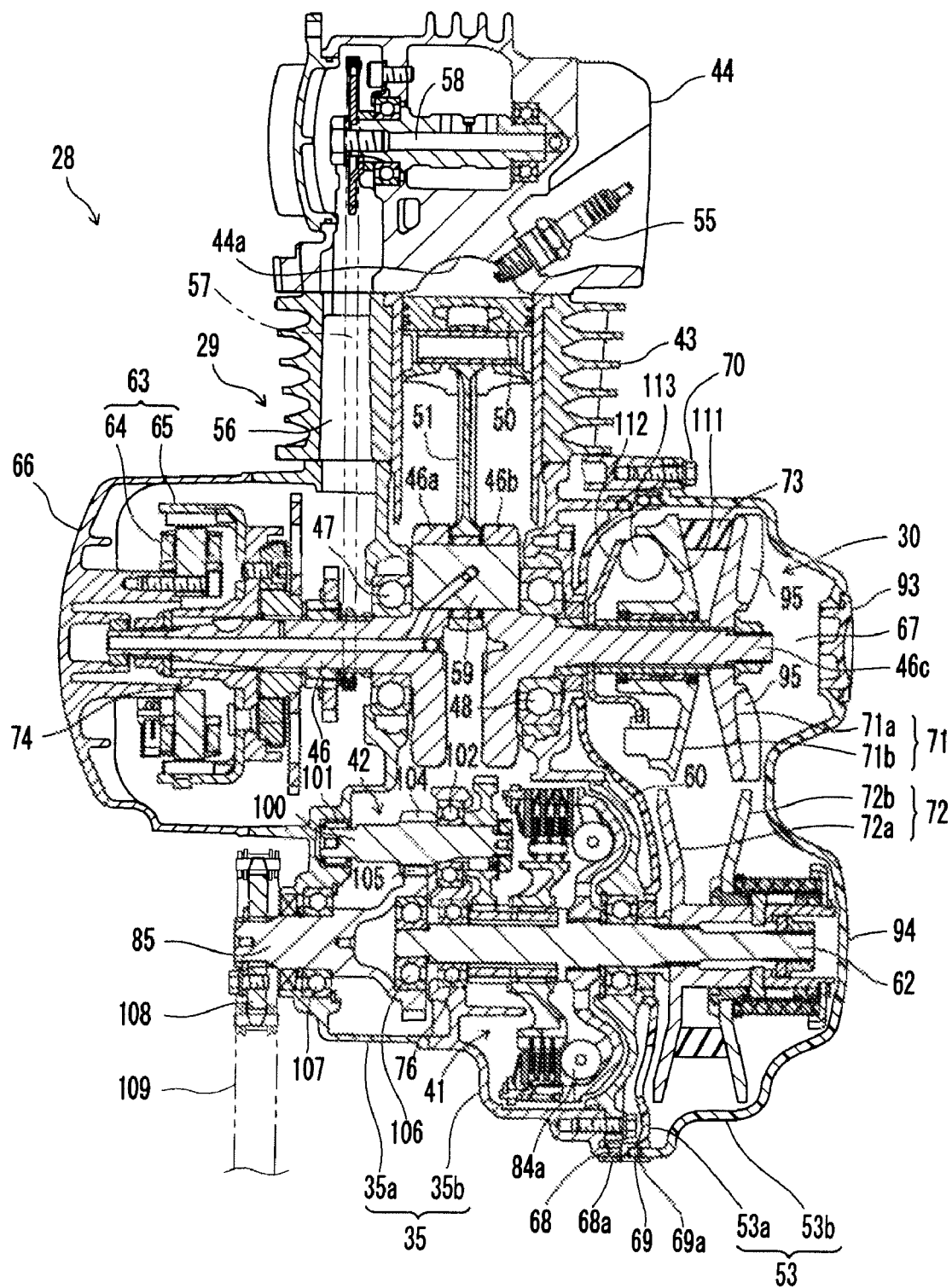
FIG. 6 is a cross sectional view showing an internal construction of the engine unit.

As shown in FIG. 6, a cam chain chamber 56 is formed on the left in the cylinder 43 to connect between an interior of the crank case 35 and an interior of the cylinder head 44. A timing chain 57 is arranged in the cam chain chamber 56. The timing chain 57 is wound around the crank shaft 46 and a cam shaft 58. As the crank shaft 46 rotates, the cam shaft 58 rotates to open and close an intake valve and an exhaust valve, which are not shown.

A generator casing 66, which accommodates therein a generator 63, is mounted detachably to the left of a front half of the first case block 35a. The transmission case 53, which accommodates therein the CVT 30, is mounted to the right of the second case block 35b.

An opening that is formed on the right of a rear half of the second case block 35b is closed by a clutch cover 60. The clutch cover 60 is fixed detachably to the second case block 35b by a bolt 61 (see FIG. 7).

The transmission case 53 is formed independently of the crank case 35 and comprises an inner case 53a, which covers an inside (left) of the CVT 30 in the vehicle width direction, and an outer case 53b, which covers an outside (right) of the CVT 30 in the vehicle width direction. The inner case 53a is mounted to the right of the crank case 35 and the outer case 53b is mounted to the right of the inner case 53a. A belt chamber 67 is formed in the inner case 53a and the outer case 53b to accommodate the CVT 30.

As shown in FIG. 6, a right end of the crank shaft 46 extends through the second case block 35b and the inner case 53a and into the belt chamber 67. A primary sheave 71 of the CVT 30 is fitted onto the right end of the crank shaft 46. Therefore, the primary sheave 71 rotates as the crank shaft 46 rotates. A right portion (strictly, a portion on the right of the bearing 48) of the crank shaft 46 forms a primary sheave shaft 46c.

On the other hand, a left end of the crank shaft 46 extends through the first case block 35a and into the generator casing 66. The generator 63 is mounted to the left end of the crank shaft 46. The generator 63 comprises a stator 64 and a rotor 65 opposed to the stator 64. The rotor 65 is fixed to a sleeve 74, which rotates together with the crank shaft 46. The stator 64 is fixed to the generator casing 66.

Figure 7:
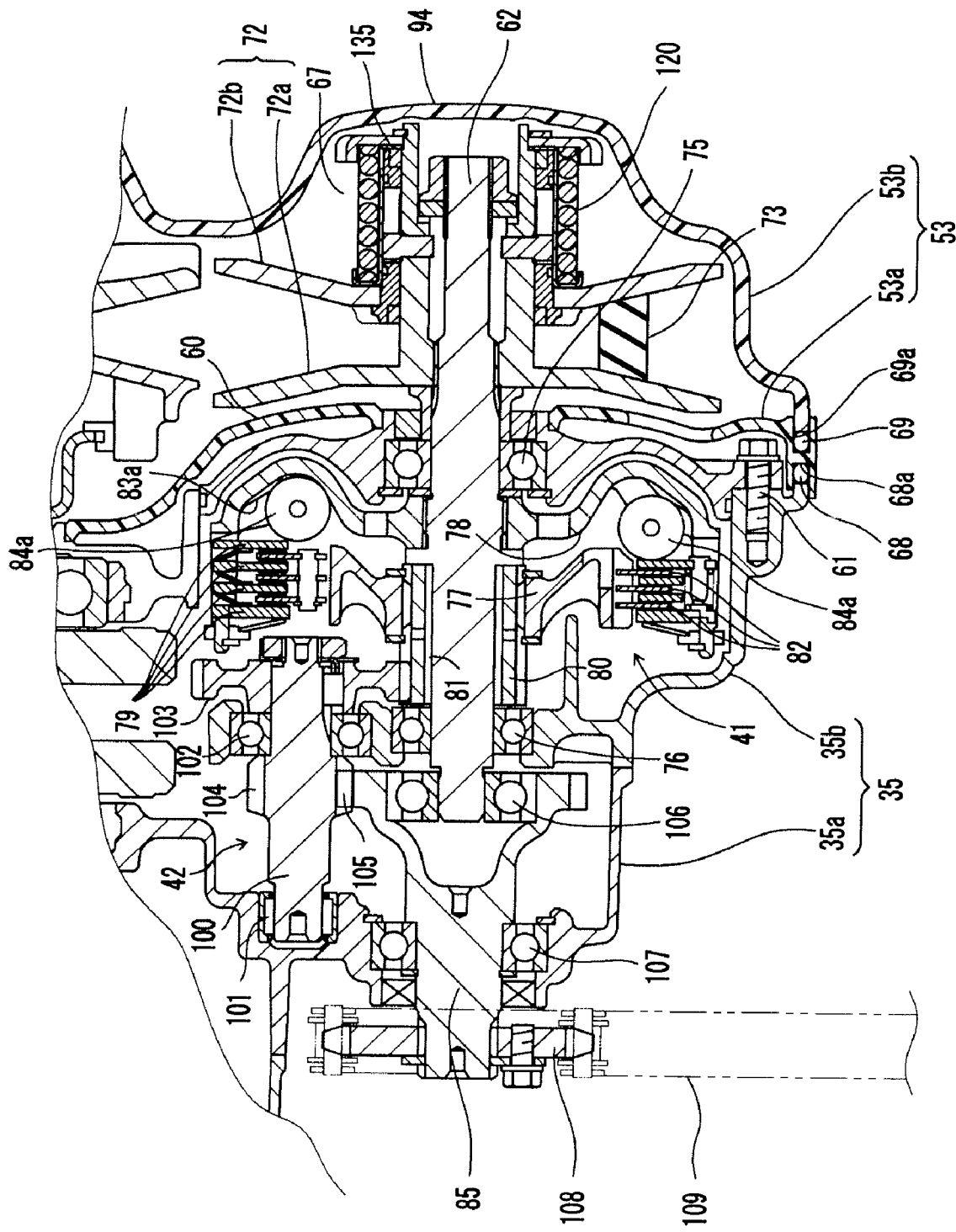
FIG. 7 is a cross sectional view showing a part of the internal construction of the engine unit.

A secondary sheave shaft 62 is arranged in a rear half of the crank case 35 to be in parallel to the crank shaft 46. As shown in FIG. 7, a portion on the right of a center of the secondary sheave shaft 62 is supported on the clutch cover 60 with a bearing 75 therebetween. A left portion of the secondary sheave shaft 62 is supported on a left end of the second case block 35b with a bearing 76 therebetween. A right end of the secondary sheave shaft 62 extends through the second case block 35b and the clutch cover 60 into the belt chamber 67. A secondary sheave 72 of the CVT 30 is connected to the right end of the secondary sheave shaft 62.

Figure 8:
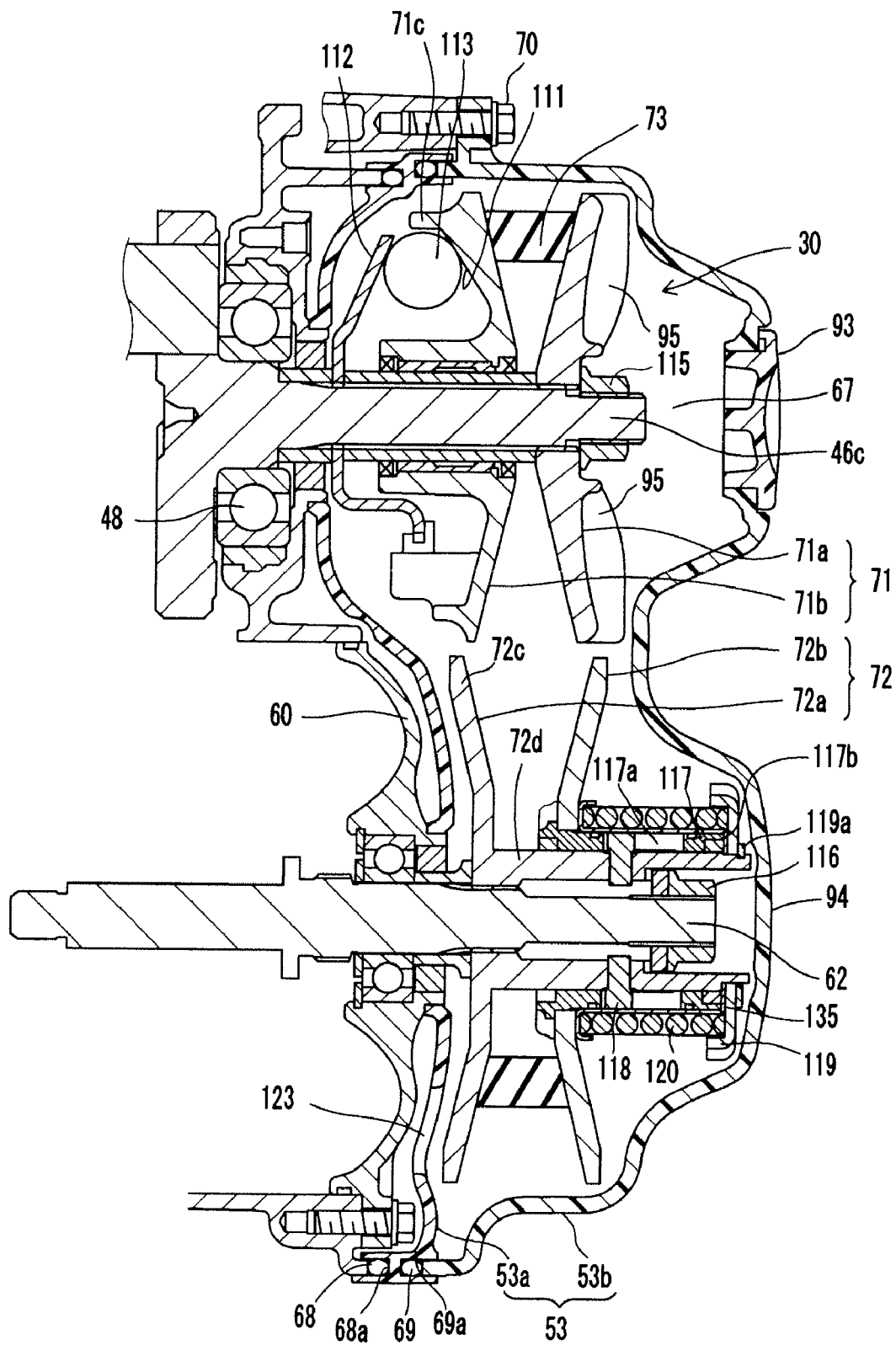
FIG. 8 is a cross sectional view showing a part of the internal construction of the engine unit.

As shown in FIG. 8, the CVT 30 comprises the primary sheave 71, the secondary sheave 72, and a V-belt 73 wound around the primary sheave 71 and the secondary sheave 72. Both the primary sheave 71 and the secondary sheave 72 are composed of metallic members. As described above, the primary sheave 71 is mounted to the primary sheave shaft 46c. The secondary sheave 72 is connected to an outside of the secondary sheave shaft 62 in the vehicle width direction. The V-belt 73 is made of rubber having heat resistance and durability. In addition, the V-belt 73 is not limited to rubber but may be made of other materials such as a resin, or a combination of rubber and a resin.

The primary sheave 71 comprises a stationary sheave half 71a positioned outside in the vehicle width direction and a moving sheave half 71b positioned inside in the vehicle width direction and opposed to the stationary sheave half 71a. The stationary sheave half 71a is clamped and fixed to a right end of the primary sheave shaft 46c by a lock nut 115 to rotate together with the primary sheave shaft 46c. The moving sheave half 71b is arranged on the left of the stationary sheave half 71a and mounted slidably to the primary sheave shaft 46c. Accordingly, the moving sheave half 71b rotates together with the primary sheave shaft 46c and is slidable axially of the primary sheave shaft 46c. A belt groove is defined between the stationary sheave half 71a and the moving sheave half 71b. A cam surface 111 is formed on a left portion of the moving sheave half 71b and a cam plate 112 is arranged on the left of the cam surface 111. A roller weight 113 is arranged between the cam surface 111 of the moving sheave half 71b and the cam plate 112. Also, formed on a front end portion (upper portion in FIG. 8) of the cam surface 111 of the moving sheave half 71b is a restriction portion 71c, which contacts the roller weight 113 to restrict a position of the roller weight 113. Also, a plurality of vanes 95 for blasting are formed on a right portion of the stationary sheave half 71a of the primary sheave 71.

The secondary sheave 72 comprises a stationary sheave half 72a positioned inside in the vehicle width direction and a moving sheave half 72b positioned outside in the vehicle width direction and opposed to the stationary sheave half 72a. The moving sheave half 72b is mounted to the right end of the secondary sheave shaft 62. The moving sheave half 72b rotates together with the secondary sheave shaft 62 and is slidable axially of the secondary sheave shaft 62. The stationary sheave half 72a comprises a sheave body portion 72c substantially in the form of a doughnut plate, around which the V-belt 73 is wound, and a boss portion 72d substantially in the form of a cylinder extending rightward from a right side of the sheave body portion 72c. The sheave body portion 72c and the boss portion 72d are formed integrally. Both the sheave body portion 72c and the boss portion 72d are spline-fitted onto the secondary sheave shaft 62. Therefore, the sheave body portion 72c and the boss portion 72d rotate together.

A cylindrical-shaped boss 117 fixed to a core portion of the moving sheave half 72b is provided on the boss portion 72d to be slidable axially of the boss portion 72d. The boss 117 is composed of a metallic member. Formed on the boss 117 in a slit manner is a slide groove 117a, with which a guide pin 118 implanted into the boss portion 72d engages slidably such that the boss portion 72d rotates together with the boss 117.

A spring bearing member 119 composed of an annular plate is mounted to a right tip end of the boss portion 72d of the stationary sheave half 72a by a circlip 119a and a coil spring 120 is interposed between the spring bearing member 119 and the moving sheave half 72b. The spring bearing member 119 is a metallic member. A lock nut 116 provided on the secondary sheave shaft 62 clamps and fixes the secondary sheave shaft 62 and the boss portion 72d of the stationary sheave half 72a together.

A resin washer 135 made of a nylon resin is provided on a side of the spring bearing member 119 toward the boss 117. The resin washer 135 may or may not be fixed to the side of the spring bearing member 119. When the moving sheave half 72b of the secondary sheave 72 comes to a Top position, in which a spacing between it and the stationary sheave half 72a becomes maximum, the boss 117 contacts the spring bearing member 119 through the resin washer 135. That is, a right tip end 117b of the boss 117 contacts a left side of the resin washer 135 and a right side of the resin washer 135 contacts the spring bearing member 119. Therefore, the moving sheave half 72b is restricted to the Top position. The spring bearing member 119 corresponds to a "stationary contact member" referred to in the invention and the boss 117 corresponds to a "moving contact member" referred to in the invention. The resin washer 135 corresponds to an "abrasion preventive layer" referred to in the invention. The spring bearing member 119, the boss 117, and the resin washer 135 constitute a "driven side stopper" referred to in the invention.

In the CVT 30, a speed reduction ratio is determined by the magnitude correlation of a force with which the roller weight 113 pushes the moving sheave half 71b of the primary sheave 71 rightward, and a force with which the coil spring 120 pushes the moving sheave half 72b of the secondary sheave 72 leftward.

That is, when the primary sheave shaft 46c is increased in rotational frequency, the roller weight 113 is acted by a centrifugal force to move radially outward to push the moving sheave half 71b rightward. Then the moving sheave half 71b moves rightward and the primary sheave 71 is increased in belt wound diameter. In keeping with this, the secondary sheave 72 is decreased in belt wound diameter and the moving sheave half 72b of the secondary sheave 72 moves rightward against the bias of the coil spring 120. Consequently, while that diameter, at which the V-belt 73 is wound around the primary sheave 71, is increased, a wound diameter around the secondary sheave 72 is decreased, so that the speed reduction ratio becomes small. When a spacing between the stationary sheave half 72a and the moving sheave half 72b on the secondary sheave 72 becomes maximum and that diameter, at which the V-belt 73 is wound around the secondary sheave 72, becomes minimum, the speed reduction ratio becomes minimum and the motorcycle 10 reaches a maximum speed. At this time, the boss 117 contacts the spring bearing member 119 through the resin washer 135 and the moving sheave half 72b is restricted to the Top position.

On the other hand, when the primary sheave shaft 46c is decreased in rotational frequency, a centrifugal force of the roller weight 113 becomes small, so that the roller weight 113 moves radially inward along the cam surface 111 of the moving sheave half 71b and the cam plate 112. Therefore, a force with which the roller weight 113 pushes the moving sheave half 71b rightward is decreased. Then, the bias of the coil spring 120 exceeds the force relatively, so that the moving sheave half 72b of the secondary sheave 72 moves leftward and the moving sheave half 71b of the primary sheave 71 correspondingly moves leftward. Consequently, while that diameter, at which the belt is wound around the primary sheave 71, is decreased, that diameter, at which the belt is wound around the secondary sheave 72, is increased and a speed reduction ratio becomes large.

As shown in FIG. 6, the outer case 53b comprises a first bulge portion 93 and a second bulge portion 94, which are bowl-shaped to bulge outside (rightward) in the vehicle width direction. The first bulge portion 93 and the second bulge portion 94 are aligned in the longitudinal direction. The first bulge portion 93 covers the primary sheave 71 and the second bulge portion 94 covers the secondary sheave 72.

A sealing groove 68a is formed on a left peripheral edge of the inner case 53a and a right peripheral edge of the second case block 35b is fitted into the sealing groove 68a. In addition, an O-ring 68 is inserted between the inner case 53a and the second case block 35b in the sealing groove 68a. Also, a sealing groove 69a is formed on a right peripheral edge of the inner case 53a and a peripheral edge of the outer case 53b is fitted into the sealing groove 69a. An O-ring 69 is inserted between the inner case 53a and the outer case 53b in the sealing groove 69a. The outer case 53b and the second case block 35b are clamped together by a bolt 70 with the inner case 53a therebetween.

As shown in FIG. 7, the centrifugal clutch 41 is mounted to the left portion of the secondary sheave shaft 62. The centrifugal clutch 41 is a wet type multiple disk clutch comprising a substantially cylindrical-shaped clutch housing 78 and a clutch boss 77. The clutch housing 78 is spline-fitted onto and rotates together with the secondary sheave shaft 62. A plurality of ring-shaped clutch disks 79 are mounted to the clutch housing 78. The clutch discs 79 are aligned at intervals axially of the secondary sheave shaft 62.

A cylindrical-shaped gear 80 is fitted rotatably onto a periphery of the left portion of the secondary sheave shaft 62 with a bearing 81 therebetween. The clutch boss 77 is arranged radially inwardly of the clutch discs 79 and radially outwardly of the gear 80 to mesh with the gear 80. Therefore, the gear 80 rotates together with the clutch boss 77. A plurality of ring-shaped friction plates 82 are mounted to a radially outside of the clutch boss 77. The friction plates 82 are aligned at intervals axially of the secondary sheave shaft 62 and are arranged between adjacent clutch discs 79, 79.

A plurality of cam surfaces 83a are formed on a left side of the clutch housing 78. Roller weights 84a are arranged between the cam surfaces 83a and the rightmost clutch disc 79 opposed to the cam surfaces 83a.

The centrifugal clutch 41 is automatically switched between a clutch-in state (connected state) and a clutch-off state (disconnected state) according to a magnitude of a centrifugal force acting on the roller weights 84a.

That is, when the rotating speed of the clutch housing 78 is equal to or larger than a predetermined speed, the roller weights 84a are caused by centrifugal forces to move radially outward and the clutch discs 79 are pushed leftward by the roller weights 84a. Consequently, there comes about a clutch-in state, in which the clutch discs 79 and the friction plates 82 come into pressure contact with each other and a drive force of the secondary sheave shaft 62 is transmitted to an output shaft 85 through the centrifugal clutch 41.

On the other hand, when the rotating speed of the clutch housing 78 is less than the predetermined speed, centrifugal forces acting on the roller weights 84a decrease and the roller weights 84a move radially inward. Consequently, there comes about a clutch-off state, in which pressure contact between the clutch discs 79 and the friction plates 82 is released and a drive force of the secondary sheave shaft 62 is not transmitted to the output shaft 85. In FIG. 7, a front (upward in FIG. 7) side of the centrifugal clutch 41 represents the clutch-off state and a rear (downward in FIG. 7) side thereof represents the clutch-in state.

The reduction mechanism 42 is interposed between the centrifugal clutch 41 and the output shaft 85. The reduction mechanism 42 comprises a transmission shaft 100 arranged in parallel to the secondary sheave shaft 62 and the output shaft 85. The transmission shaft 100 is supported rotatably on the first case block 35a with a bearing 101 therebetween and supported rotatably on the second case block 35b with a bearing 102 therebetween. A first transmission gear 103 (see FIG. 7) is provided at a right end of the transmission shaft 100 to mesh with the gear 80.

A second transmission gear 104 having a smaller diameter than that of the first transmission gear 103 is provided centrally of the transmission shaft 100. A third transmission gear 105 is formed on an outer periphery of a right end of the output shaft 85 to mesh with the second transmission gear 104. An inner periphery of the right end of the output shaft 85 is supported on a left end of the secondary sheave shaft 62 with a bearing 106 therebetween. Accordingly, the output shaft 85 is supported rotatably on the secondary sheave shaft 62 with a bearing 106 therebetween and arranged to be coaxial (on a straight line) with the secondary sheave shaft 62. Also, a center of the output shaft 85 is supported rotatably on the left end of the second case block 35b with a bearing 107 therebetween.

With such construction, the clutch boss 77 and the output shaft 85 are connected to each other through the gear 80, the first transmission gear 103, the transmission shaft 100, the second transmission gear 104, and the third transmission gear 105. Therefore, the output shaft 85 rotates as the clutch boss 77 rotates.

A left end of the output shaft 85 extends through the first case block 35a to project outside the crank case 35. A drive sprocket 108 is fixed to the left end of the output shaft 85. A chain 109 is wound around the drive sprocket 108 to serve as a power transmission mechanism, which transmits a drive force of the output shaft 85 to the rear wheel 26. The power transmission mechanism is not limited to the chain 109 but may comprise a transmission belt, a gear mechanism composed of a combination of plural gears, a drive shaft, and other members.

Figure 9:
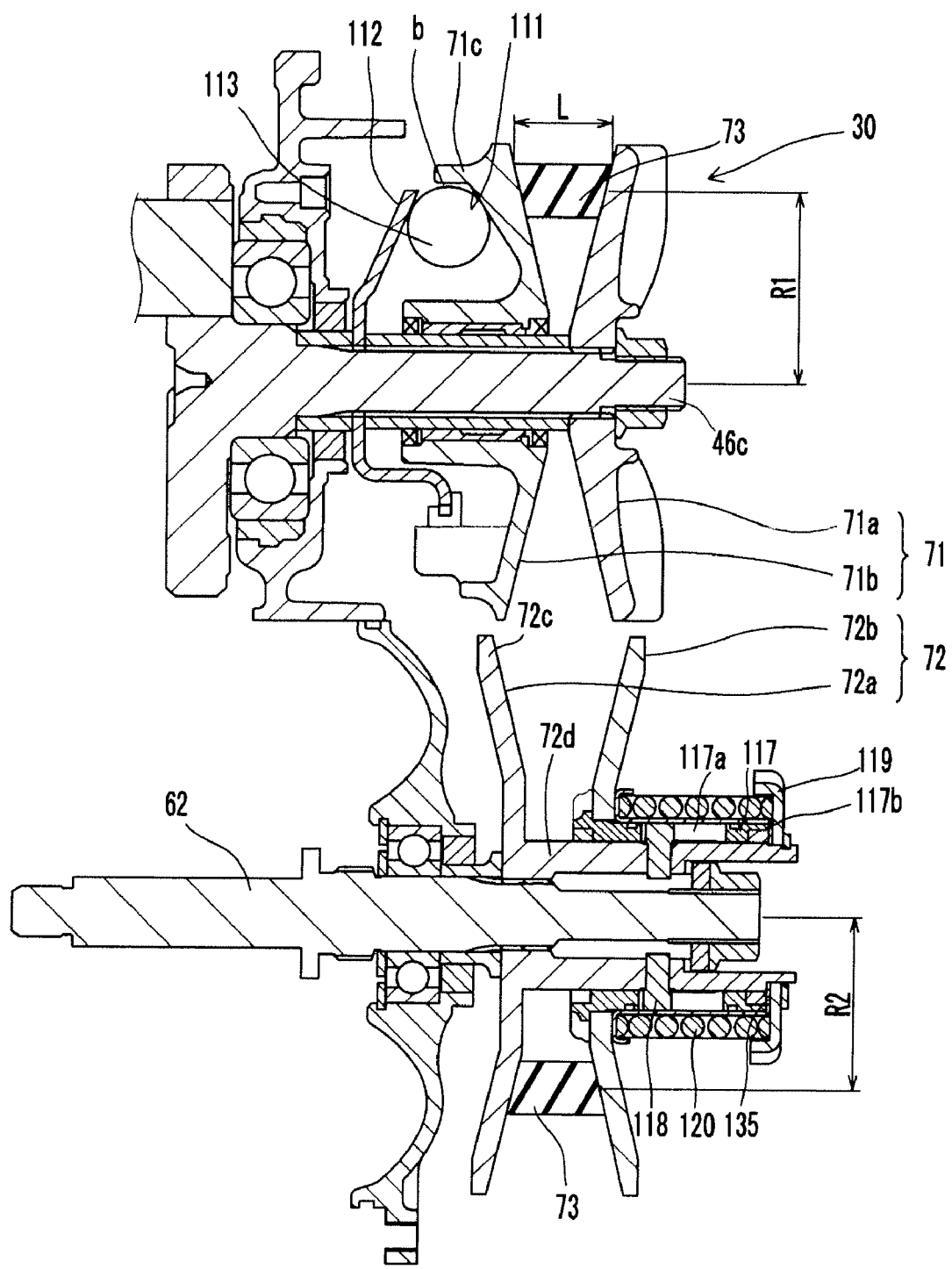
FIG. 9 is a view illustrating a change in diameter, at which a V-belt is wound, as a travel distance is increased.

FIG. 9 shows the case where a travel distance is substantially zero and the V-belt 73 is little used. As shown in FIG. 9, the tip end 117b of the boss 117 fixed to the moving sheave half 72b contacts through the resin washer 135 with the spring bearing member 119 and the moving sheave half 72b is restricted to the Top position, in which a spacing between it and the stationary sheave half 72a is maximum. At the time of Top, a speed reduction ratio is minimum and the motorcycle 10 reaches a maximum speed. In the Top position, a spacing between the moving sheave half 71b and the stationary sheave half 71a on the primary sheave 71 is minimum. In this state, a clearance b is defined between the roller weight 113 and the moving sheave half 71b of the primary sheave 71. At this time, R1 indicates a wound diameter of the primary sheave 71 and R2 indicates a wound diameter of the secondary sheave 72.

Figure 10:
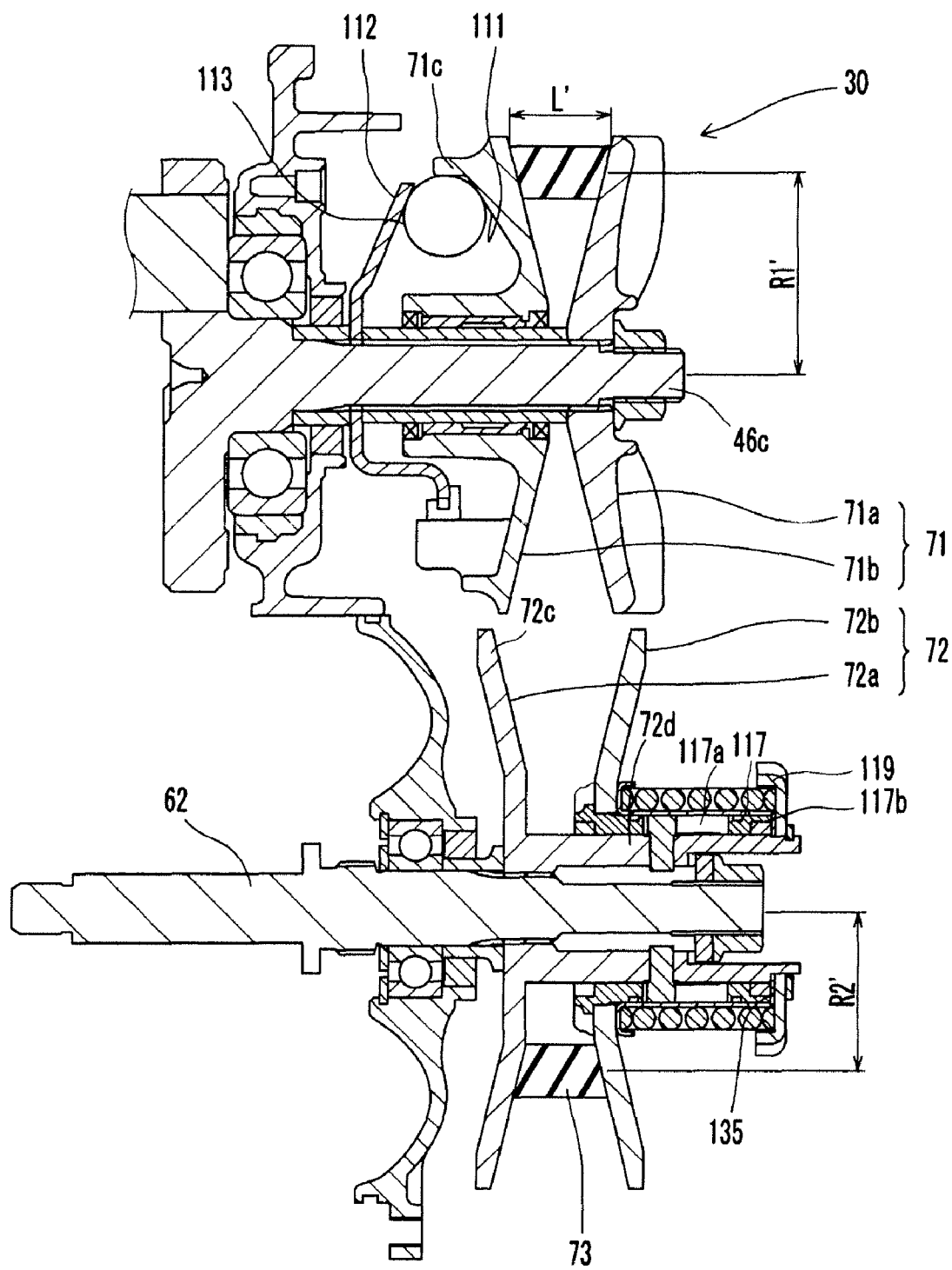
FIG. 10 is a view illustrating a change in diameter, at which a V-belt is wound, as a travel distance is increased.

As a travel distance increases, the V-belt 73 abrades and is decreased in width. When a travel distance reaches, for example, a predetermined distance D1 km, a belt width of the V-belt 73 is decreased to L' from L as shown in FIG. 10. Then, the moving sheave half 71b of the primary sheave 71 moves toward the stationary sheave half 71a corresponding to an amount as abraded, so that a wound diameter of the primary sheave 71 is increased a little to R1' from R1. At this time, the roller weight 113 contacts the restriction portion 71c, which is formed on the moving sheave half 71b, so that the clearance b (see FIG. 9) disappears. Thereby, the moving sheave half 71b is restricted to the corrected Top position, in which a spacing between it and the stationary sheave half 71a becomes smaller than that shown in FIG. 9.

On the other hand, for the secondary sheave 72, since the moving sheave half 72b is restricted to the Top position, the V-belt 73 moves toward the core portion and a wound diameter is decreased a little to R2' from an initial R2. In this manner, until the travel distance D1 km is reached since the start of running, the speed reduction ratio at the time of Top is decreased corresponding to an amount by which the V-belt 73 is abraded.

Figure 11:
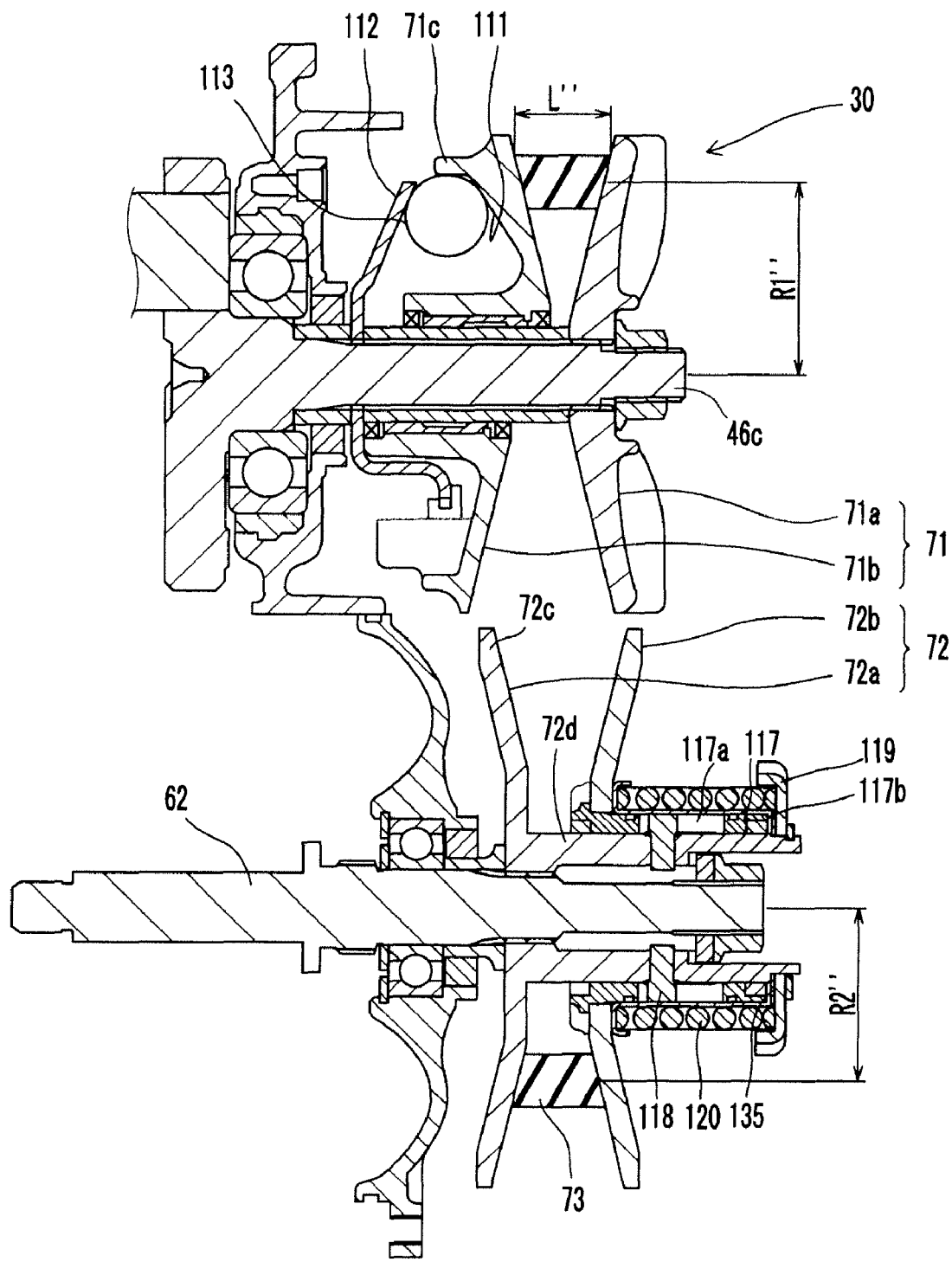
FIG. 11 is a view illustrating a change in diameter, at which a V-belt is wound, as a travel distance is increased.

When a travel distance is further increased from a state shown in FIG. 10 and reaches D2 (>D1), a belt width of the V-belt 73 is further decreased to L" from L' as shown in FIG. 11. At this time, since the moving sheave half 71b of the primary sheave 71 is restricted to the corrected Top position, the V-belt 73 moves toward the core portion and a wound diameter is returned to R1", which is substantially equal to an initial R1. On the other hand, the moving sheave half 72b of the secondary sheave 72 is caused by the bias of the coil spring 120 to move toward the stationary sheave half 72a corresponding to an amount, by which the V-belt 73 is abraded, whereby a wound diameter of the secondary sheave is returned to R2", which is substantially equal to an initial R2. In this manner, until a travel distance reaches D2 km from D1 km, a speed reduction ratio at the time of Top is increased as the V-belt 73 is abraded.

As shown in FIGS. 9 to 11, until a travel distance D1 km is reached since the V-belt 73 is in a state of being new, a speed reduction ratio at the time of Top is decreased as the V-belt 73 is abraded, and after D1 km is exceeded, a speed reduction ratio at the time of Top is increased as the V-belt 73 is abraded.

Figure 12:
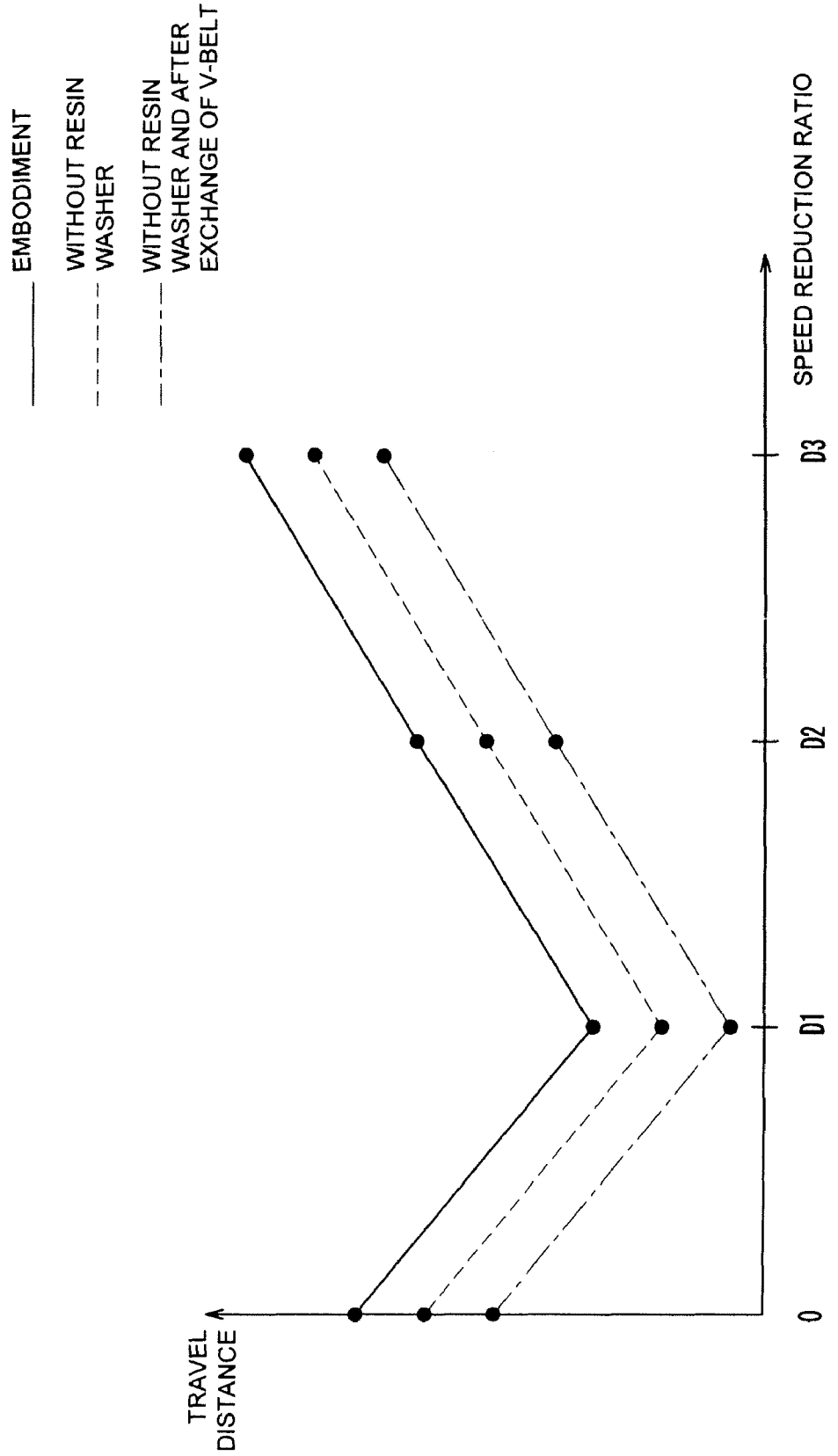
FIG. 12 is a characteristic graph illustrating the relationship between a travel distance and a speed reduction ratio at the time of Top.

FIG. 12 is a characteristic graph illustrating the relationship between a travel distance and a speed reduction ratio at the time of Top. In FIG. 12, a solid line indicates the relationship between a speed reduction ratio at the time of Top and a travel distance in the CVT 30 according to the embodiment, and a broken line indicates the relationship in a CVT according to the related art, that is, a CVT, in which the resin washer 135 is not provided, for the purpose of comparison. Further, an alternate long and short dash line indicates the relationship when a V-belt is exchanged after running over a predetermined distance for a CVT according to the related art, in which the resin washer 135 is not provided.

As shown in FIG. 12, with both the CVT 30 according to the embodiment and a CVT according to the related art, until a travel distance D1 km is reached, a speed reduction ratio at the time of Top is decreased as a travel distance is increased, and when a travel distance D1 km is exceeded, a speed reduction ratio at the time of Top is increased as a travel distance is increased. However, with the CVT 30 according to the embodiment, a speed reduction ratio is slowly decreased until a travel distance D1 km is reached, as compared with the CVT according to the related art. The reason for this is that, with the CVT 30 according to the embodiment, the resin washer 135 is interposed between the boss 117 and the spring bearing member 119. That is, since the resin washer 135 is mounted, the boss 117 and the spring bearing member 119 are not scraped even when the boss 117 collides repeatedly against the spring bearing member 119 through the resin washer 135 during running. Therefore, even when a travel distance is increased, the Top position of the moving sheave half 72b is not varied.

On the other hand, with the CVT according to the related art, since the resin washer 135 is not mounted, a boss collides repeatedly against a spring bearing member during running whereby the boss and the spring bearing member are scraped. Then, a spacing between a moving sheave half and a stationary sheave half becomes large at the time of Top, which causes a V-belt to move toward a core portion. Consequently, as a travel distance is increased, a speed reduction ratio at the time of Top is rapidly decreased.

As described above, with the CVT according to the related art, as a travel distance is increased, the Top position of the moving sheave half shifts in a direction, in which a spacing between the moving sheave half and the stationary sheave half becomes large. A spacing between the stationary sheave half 72a and the moving sheave half 72b in the Top position is different between an initial state, in which the boss 117 and the spring bearing member 119 are not scraped, and a state after the exchange of the V-belt 73 (a state, in which the boss 117 and the spring bearing member 119 are scraped). Therefore, as shown in FIG. 12, in running after the exchange by a new V-belt, the relationship (polygonal line indicated by the alternate long and short dash line) between a travel distance and a speed reduction ratio at the time of Top does not agree with the relationship (polygonal line indicated by the broken line) before the exchange but shifts therefrom.

On the other hand, with the CVT 30 according to the embodiment, the resin washer 135 is interposed between the boss 117 and the spring bearing member 119 whereby the boss 117 and the spring bearing member 119 are not scraped. Therefore, as a travel distance is increased, the Top position of the moving sheave half 72b is not varied. Consequently, in running after the exchange by a new V-belt, the relationship between a travel distance and a speed reduction ratio at the time of Top agrees with the relationship (polygonal line indicated by the solid line) before the exchange.

As described above, according to the embodiment, the resin washer 135 made of a nylon resin is interposed between the boss 117 fixed to the moving sheave half 72b of the secondary sheave 72 and the spring bearing member 119. The boss 117 contacts through the resin washer 135 with the spring bearing member 119 whereby the moving sheave half 72b is restricted to the Top position, in which a spacing between it and the stationary sheave half 72a becomes maximum. Therefore, even when the boss 117 collides against the spring bearing member 119 through the resin washer 135 during running, the colliding portions are not scraped. Consequently, as a travel distance is increased, the Top position of the moving sheave half 72b is not varied, so that it becomes possible to prevent a maximum speed from being varied in running after the V-belt 73 is exchanged.

Also, according to the embodiment, dust or the like generated due to collisions between the boss 117 and the spring bearing member 119 can be prevented from having various adverse influences on the V-belt 73. For example, it is possible to prevent the dust or the like from being interposed between the V-belt 73 and the sheave (the primary sheave 71 or the secondary sheave 72) to cause the V-belt 73 to slip or to considerably abrade and deteriorate the V-belt 73.

Second Embodiment

Figure 13:
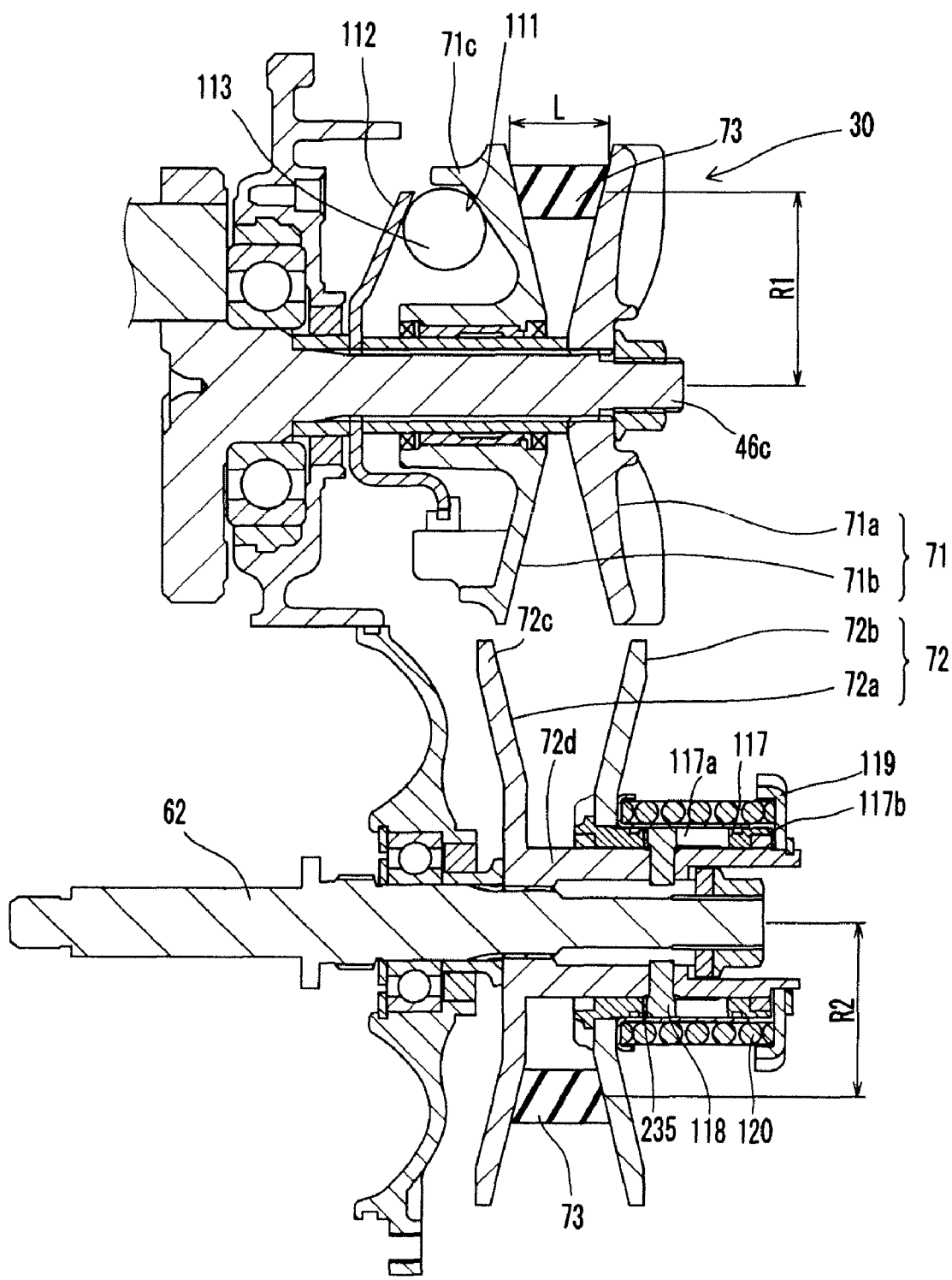
FIG. 13 is a cross sectional view showing a part of an internal construction of an engine unit according to a second embodiment of the invention.

FIG. 13 is a cross sectional view showing an internal construction of a part of an engine unit provided on a motorcycle according to a second embodiment of the invention. Constituent members in FIG. 13 that are the same as those provided on the motorcycle 10, according to the first embodiment shown in FIGS. 1 to 12, are denoted by the same reference numerals as those in the latter.

FIG. 13 shows the case where a travel distance is substantially 0 and a V-belt 73 is little used. With a CVT 230 according to the second embodiment, a resin sheet 235 made of a nylon resin is mounted to an end of a slide groove 117a toward a moving sheave half 72b. When the moving sheave half 72b comes to a Top position, in which a spacing between it and a stationary sheave half 72a is maximum, the boss 117 contacts through the resin sheet 235 with a guide pin 118 and the moving sheave half 72b is restricted to the Top position. In addition, at this time, some clearance is defined between a right tip end 117b of the boss 117 and a spring bearing member 119. Accordingly, the boss 117 and the spring bearing member 119 do not collide against each other during running.

As described above, the resin sheet 235 is mounted to an end of a slide groove 117a, which is formed on the boss 117, toward the moving sheave half 72b, so that when the moving sheave half 72b comes to the Top position, the boss 117 contacts through the resin sheet 235 with the guide pin 118, which is implanted into a boss portion 72d, whereby the moving sheave half 72b is restricted to the Top position. Therefore, even when the boss 117 collides against the guide pin 118 through the resin sheet 235 during running, the colliding portions are not scraped. Consequently, as a travel distance is increased, it is possible to prevent the Top position of the moving sheave half 72b from being varied.

Third Embodiment

The first and second embodiments have been described with respect to the case where an abrasion preventive layer (the resin washer 135, the resin sheet 235) is provided on a side of the secondary sheave 72. A third embodiment described below will be described with respect to the case where a further abrasion preventive layer is also provided on a side of a primary sheave 71 and the abrasion preventive layer protects portions, which contact together when a moving sheave half 71b of the primary sheave 71 is restricted to the corrected Top position.

Figure 14:
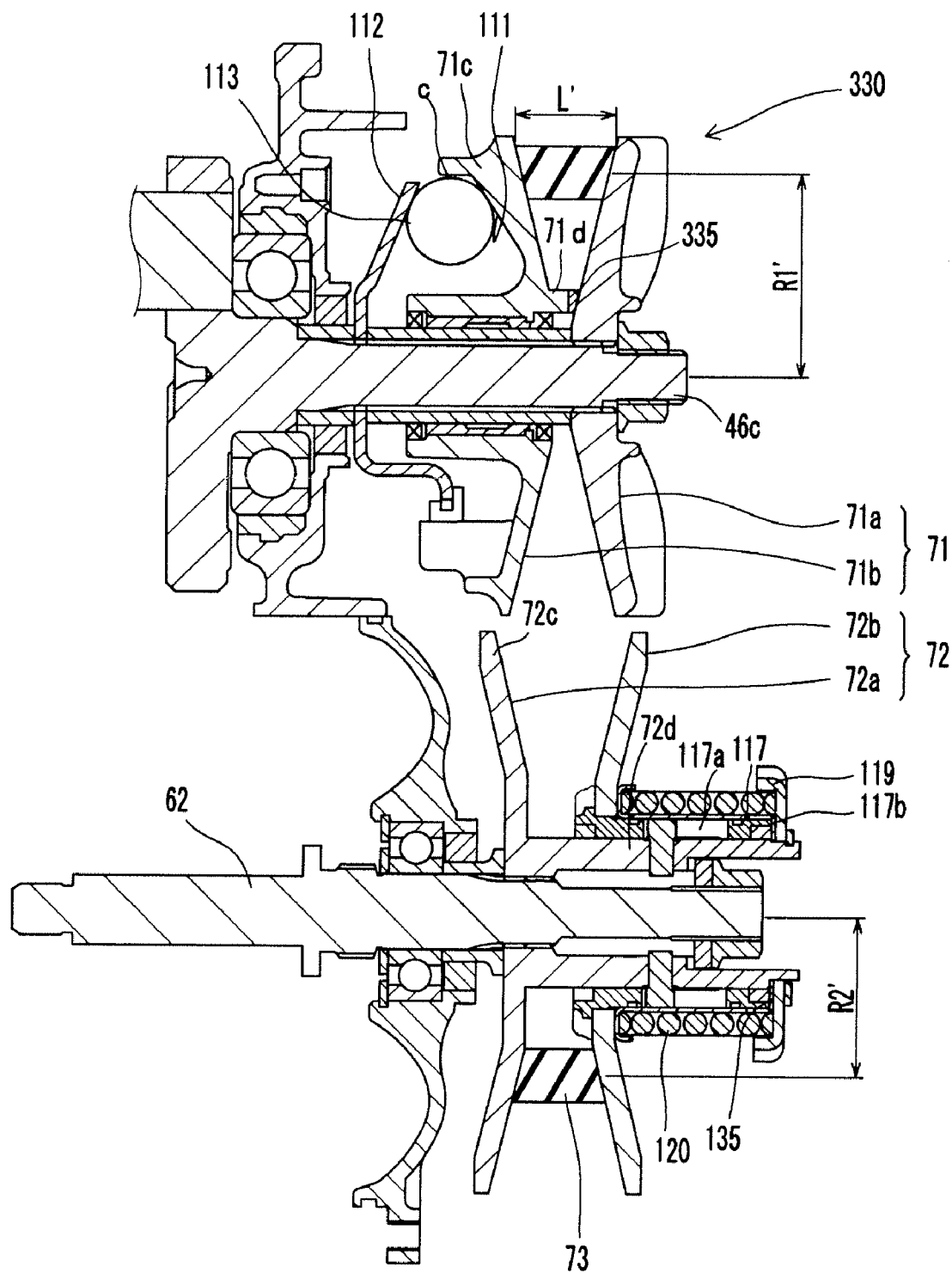
FIG. 14 is a cross sectional view showing a part of an internal construction of an engine unit according to a third embodiment of the invention.

FIG. 14 is a cross sectional view showing an internal construction of a part of an engine unit provided on a motorcycle according to a third embodiment of the invention. Constituent members in FIG. 14 that are the same as those provided on the motorcycle 10, according to the first embodiment shown in FIGS. 1 to 12, are denoted by the same reference numerals as those in the latter.

FIG. 14 shows the case where a travel distance reaches D1 km (see FIG. 12) and a belt width of a V-belt 73 is decreased to L' from L at the start of use. In a CVT 330 according to the third embodiment, a resin washer 135 is interposed between a boss 117 fixed to a moving sheave half 72b and a spring bearing member 119 in the same manner as the CVT 30 according to the first embodiment. Thereby, the moving sheave half 72b of the secondary sheave 72 is restricted to the Top position.

Also, in the CVT 330 according to the third embodiment, a substantially cylindrical-shaped boss 71d is provided on a core portion of the moving sheave half 71b of the primary sheave 71. The boss 71d extends toward a stationary sheave half 71a from the core portion of the moving sheave half 71b. The boss 71d is formed integral with the moving sheave half 71b but may be fixed separately therefrom. A resin coating layer 335 made of a nylon resin is formed on an end of the boss 71d toward the stationary sheave half 71a. The boss 71d contacts through the resin coating layer 335 with the stationary sheave half 71a whereby the moving sheave half 71b is restricted to the corrected Top position. In the corrected Top position, a roller weight 113 does not contact with a restriction portion 71c of the moving sheave half 71b, so that a clearance c is formed.

According to the embodiment, the boss 71d extending toward the stationary sheave half 71a is formed integral with the moving sheave half 71b of the primary sheave and the resin coating layer 335 is formed at the tip end of the boss 71d. The boss 71d contacts through the resin coating layer 335 with the stationary sheave half 71a whereby the moving sheave half 71b is restricted to the corrected Top position. Therefore, even when the boss 71d collides against the stationary sheave half 71a through the resin coating layer 335 during running, colliding portions are not scraped. Consequently, as a travel distance is increased, it is possible to prevent the corrected Top position of the stationary sheave half 71b from being varied.

Figure 15:
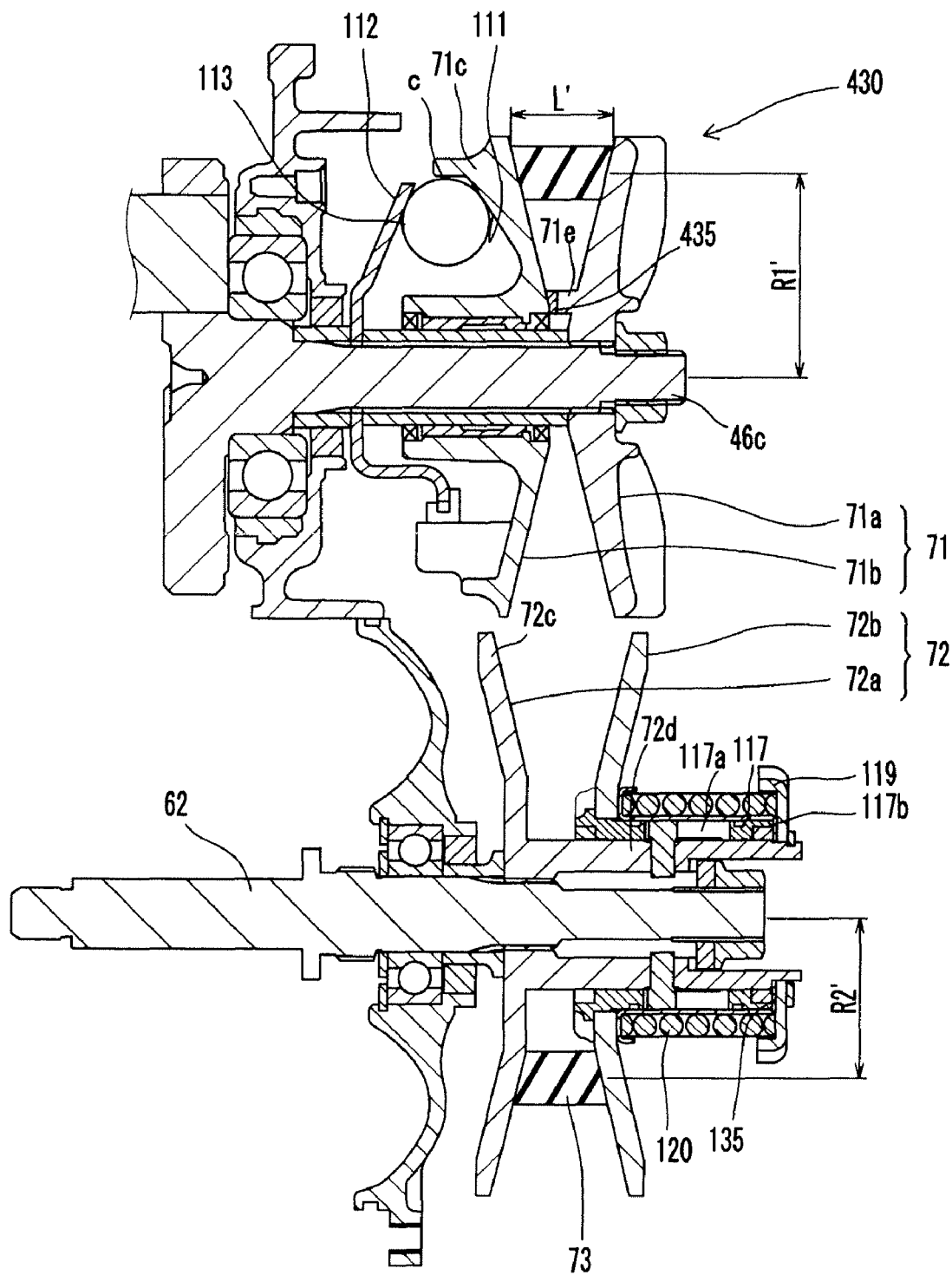
FIG. 15 is a cross sectional view showing a part of an internal construction of an engine unit according to a modification of the invention.

In addition, in restricting a spacing between the stationary sheave half 71a and the moving sheave half 71b on the primary sheave 71 to the corrected Top position, the boss 71d may be provided on the moving sheave half 71b as shown in the third embodiment, or the stationary sheave half 71a as shown in FIG. 15.

In FIG. 15, a substantially cylindrical-shaped boss 71e is provided on a core portion of the stationary sheave half 71a of the primary sheave 71. The boss 71e extends from the core portion of the stationary sheave half 71a toward the moving sheave half 71b. In addition, in FIG. 15, the boss 71e is formed integral with the stationary sheave half 71a but may be fixed separately therefrom. A resin coating layer 435 made of a nylon resin is formed at an end of the boss 71e toward the moving sheave half 71b. The boss 71e contacts through the resin coating layer 435 with the moving sheave half 71b whereby the moving sheave half 71b is restricted to the corrected Top position. With the construction shown in FIG. 15, the same effect as that of the CVT 330 according to the third embodiment can be produced.

While the first to third embodiments have been described with respect to an abrasion preventive layer (the resin washer 135, the resin sheet 235, and the resin coating layers 335, 435) made of a nylon resin, the abrasion preventive layer in the invention is not limited to this material provided that abrasion and deterioration by collision can be prevented, and may be made of other abrasion-resistant resins or a material (for example, rubber, etc.) other than resins. As abrasion-resistant resins preferably used for the abrasion preventive layer include, for example, and without limitation, PP (polypropylene), PET (polyethylene terephthalate), PBT (polybutylene terephthalate), fluorocarbon resin, acrylic resin, etc.

According to the first embodiment, the right tip end 117b of the boss 117 contacts with the left side of the resin washer 135 whereby the moving sheave half 72b is restricted to the Top position. In this case, however, a contact area between the tip end 117b and the resin washer 135 is small, so that there may be a problem in stability when restricted to the Top position. Therefore, it is desirable to increase a contact area with the resin washer 135.

Figure 16:
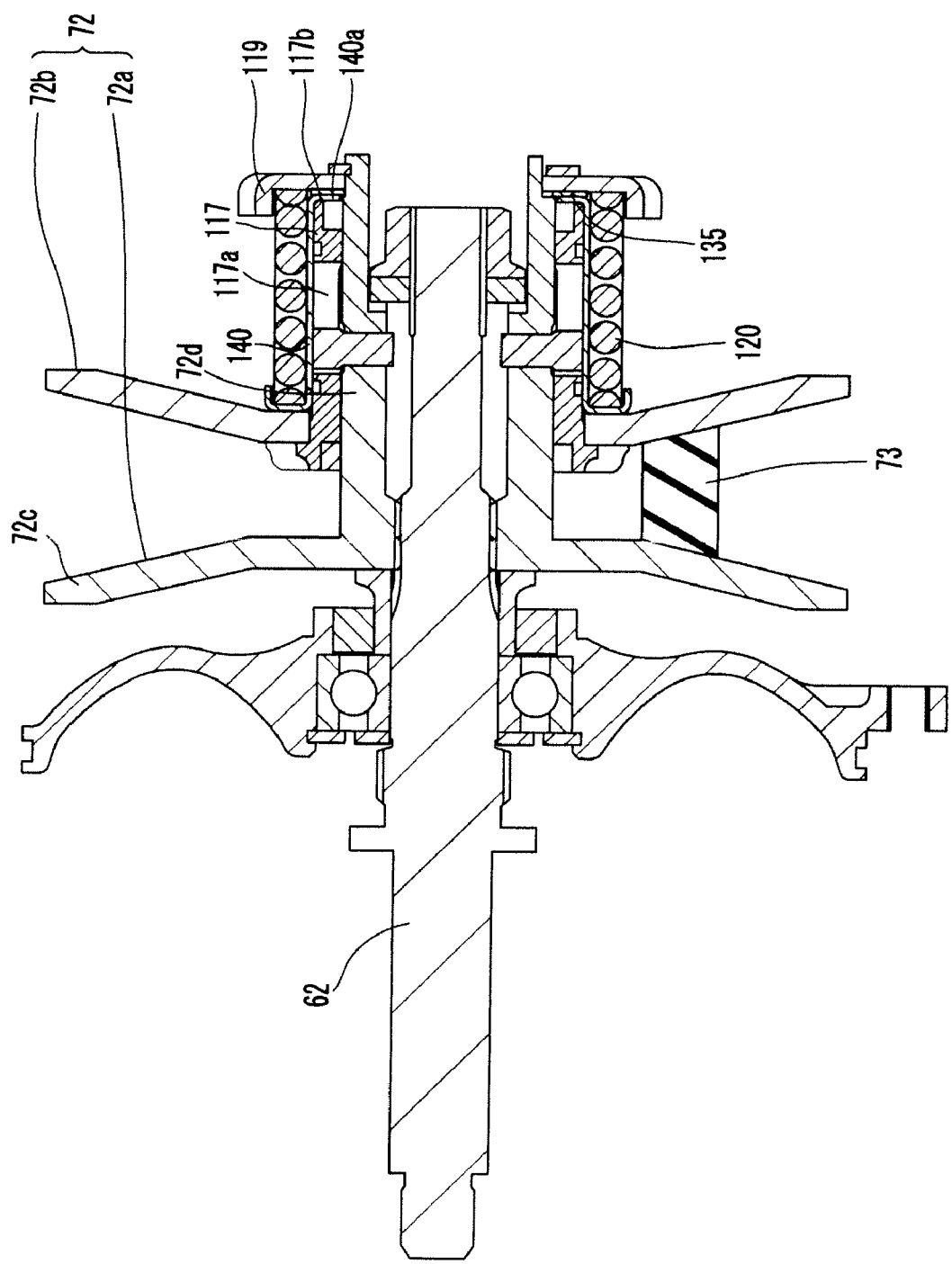
FIG. 16 is a cross sectional view showing a neighborhood of a secondary sheave in an engine unit according to a further modification of the invention.
Figure 17:
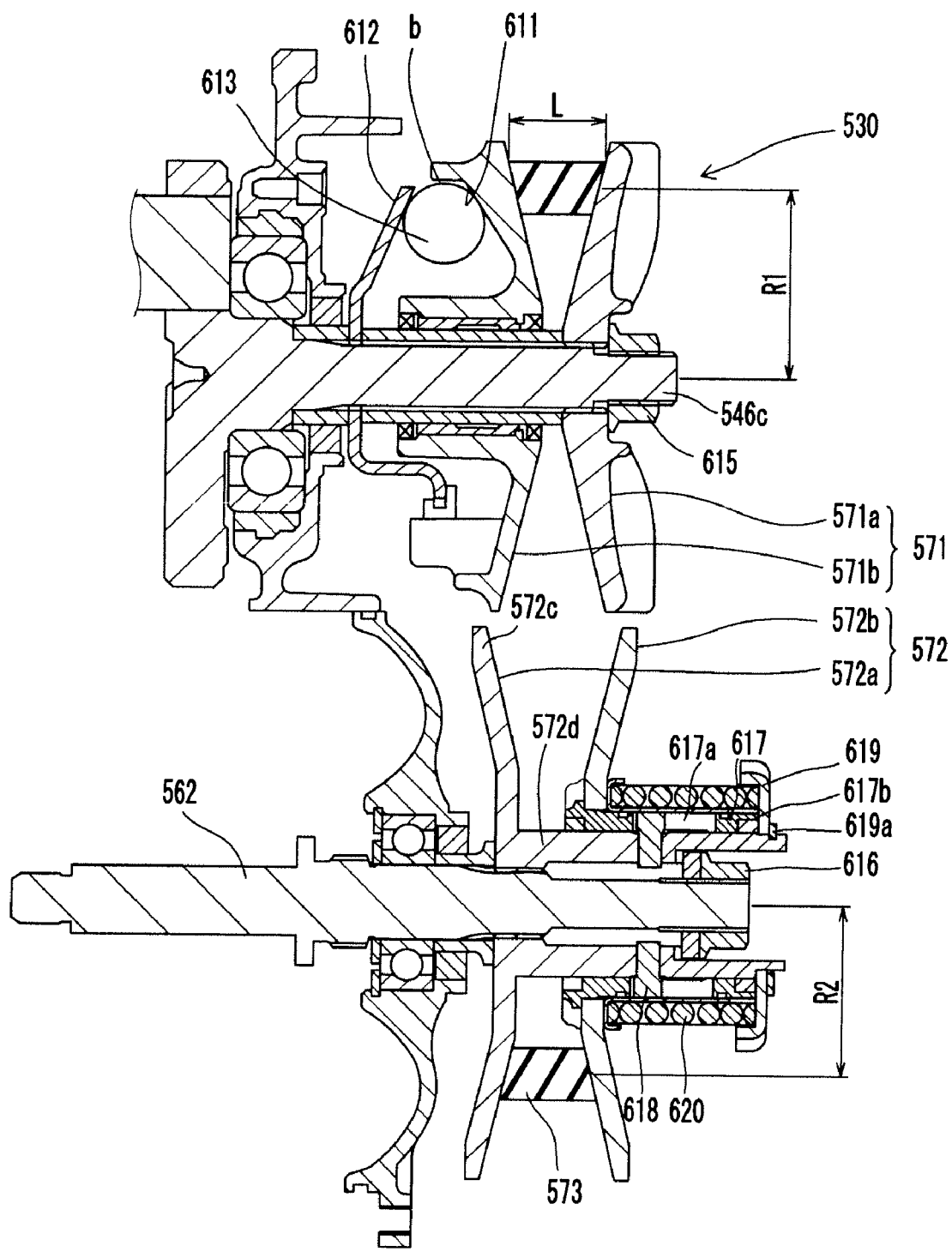
FIG. 17 is a cross sectional view showing a construction of a V-belt type continuously variable transmission according to the related art.

FIG. 16 illustrates a method of increasing a contact area with the resin washer 135. In FIG. 16, there is provided a substantially cylindrical-shaped, moving type spring bearing member 140 fixed to the boss 117. Therefore, the moving type spring bearing member 140 moves axially together with the boss 117. The moving type spring bearing member 140 is provided to support a left end of a coil spring 120. In addition, a right end of the coil spring 120 is supported by the spring bearing member 119 fixed to a stationary sheave half 72a.

An abutment 140a bent toward the core is formed at a right end of the moving type spring bearing member 140 and covers a right side of the boss 117. A right side of the abutment 140a abuts against the resin washer 135 whereby the moving sheave half 72b is restricted to the Top position. In this manner, the contact area between the abutment 140a and the resin washer 135 becomes larger than that in the case where the right tip end 117b of the boss 117 contacts with the resin washer 135. Therefore, an improvement in stability is achieved when the moving sheave half 72b is restricted to the Top position.

Also, as a method of preventing a change, in a corrected Top position, caused by an increase in travel distance, except the third embodiment, an abrasion preventive layer may be formed between the restriction portion 71c formed on the moving sheave half 71b of the primary sheave 71 and the roller weight 113. With such construction, it is possible to prevent a change, in a corrected Top position of the moving sheave half 71b, caused by abrasion and deterioration of the roller weight 113 and the restriction portion 71c with an increase in travel distance.

According to the invention, it is not necessarily to completely prevent scraping caused by collisions between a moving contact member and a stationary contact member, but it suffices that an abrasion preventive layer is mounted to reduce scraping caused by collisions between a moving contact member and a stationary contact member.

Also, while the embodiment has been described with respect to a motorcycle having an engine as a drive force generator, the invention is not so limited and the drive force generator may be a motor, or the like.

As described above, the invention is useful for V-belt type continuously variable transmissions provided on a straddle-type vehicle such as motorcycles, etc.

The particular embodiments of the invention described in this document should be considered illustrative, rather than restrictive. Modification to the described embodiments may be made without departing from the spirit of the invention as defined by the following claims.

The invention claimed is:

1. A V-belt type continuously variable transmission comprising:
   first and second sheave shafts;
   first and second sheaves that rotate together with the first and second sheave shafts, respectively, wherein each of the first and second sheaves comprises a stationary sheave half that is axially immovable, and a moving sheave half that rotates together with the first and second sheave shafts and is axially movable;
   a V-belt wound around the first and second sheaves; and
   a stopper comprising a stationary contact member arranged to be axially immovable, a moving contact member integral with, or separate from, the moving sheave half, and an abrasion preventive layer made of an abrasion-resistant material and interposed between the stationary contact member and the moving contact member; and an elastic body arranged between the moving sheave and the stationary contact member; wherein the moving contact member is arranged to contact the stationary contact member through the abrasion preventive layer when a spacing between the moving sheave half and the stationary sheave half becomes maximum to thereby restrict the spacing between the moving sheave half and the stationary sheave half;

the stationary contact member, the moving contact member, and the abrasion preventive layer overlap with each other in an axial direction of the first sheave shaft or the second sheave shaft; and the abrasion preventive layer is not provided between the elastic body and the stationary contact member.

2. The V-belt type continuously variable transmission according to claim 1, wherein the abrasion preventive layer comprises a washer made of the abrasion-resistant material.

3. The V-belt type continuously variable transmission according to claim 1, wherein the abrasion preventive layer comprises a coating layer provided on the moving contact member and/or the stationary contact member and made of the abrasion-resistant material.

4. The V-belt type continuously variable transmission according to claim 1, wherein the abrasion-resistant material is an abrasion-resistant resin.

5. The V-belt type continuously variable transmission according to claim 4, wherein the abrasion-resistant material is a nylon resin.

6. The V-belt type continuously variable transmission according to claim 1, wherein:

the first sheave comprises a primary sheave and the second sheave comprises a secondary sheave that receives a drive force from the primary sheave;

the first sheave shaft comprises a primary sheave shaft that rotates together with the primary sheave, and the second sheave shaft comprises a secondary sheave shaft that rotates together with the secondary sheave;

the moving sheave half of the primary sheave is arranged to move toward the stationary sheave half due to a centrifugal force generated by rotation of a crank shaft;

the moving sheave half of the secondary sheave is biased toward the stationary sheave half by the elastic body; and the stopper comprises a driven side stopper that restricts the moving sheave half of the secondary sheave to a Top position, in which the spacing between the moving sheave half and the stationary sheave half becomes maximum.

7. The V-belt type continuously variable transmission according to claim 6, wherein the stopper further comprises a drive side stopper that restricts the moving sheave half of the primary sheave to a corrected Top position, in which a spacing between the moving sheave half and the stationary sheave half is smaller by a predetermined spacing than that in the Top position.

8. The V-belt type continuously variable transmission according to claim 6, wherein:

the elastic body comprises a spring;

the stationary contact member comprises a spring bearing member fixed to the secondary sheave shaft;

the moving contact member of the driven side stopper comprises a first boss, integral with, or separate from, the moving sheave half of the secondary sheave; and the first boss contacts the spring bearing member through the abrasion preventive layer, whereby the moving sheave half is restricted to the Top position.

9. The V-belt type continuously variable transmission according to claim 6, wherein:

the moving contact member of the driven side stopper comprises a second boss integral with, or separate from, the moving sheave half of the secondary sheave;

the stationary contact member of the driven side stopper comprises a guide pin implanted into the stationary sheave half;

the second boss includes a slide groove, in which the guide pin moves slidingly; and the second boss contacts the guide pin through the abrasion preventive layer whereby the moving sheave half is restricted to the Top position.

10. The V-belt type continuously variable transmission according to claim 7, wherein the primary sheave comprises, as the moving contact member of the drive side stopper, a third boss integral with, or separate from, the moving sheave half to extend toward the stationary sheave half, and the third boss contacts the stationary sheave half through the abrasion preventive layer whereby the moving sheave half is restricted to the corrected Top position.

11. The V-belt type continuously variable transmission according to claim 7, wherein the primary sheave comprises, as the stationary contact member of the drive side stopper, a fourth boss integral with, or separate from, the stationary sheave half to extend toward the moving sheave half, and the fourth boss contacts the moving sheave half through the abrasion preventive layer whereby the moving sheave half is restricted to the corrected Top position.

12. A straddle-type vehicle comprising the V-belt type continuously variable transmission according to claim 1.

\* \* \* \* \*